(12) United States Patent
Tanaka et al.

(10) Patent No.: US 7,515,175 B2
(45) Date of Patent: Apr. 7, 2009

(54) IMAGE OBTAINING METHOD, IMAGE PICK-UP DEVICE, IMAGE PICK-UP INFORMATION TRANSMITTING SYSTEM, IMAGE TRANSMITTER AND PRINT SYSTEM

(75) Inventors: Hiroshi Tanaka, Asaka (JP); Koichi Yahagi, Asaka (JP); Iwao Kawashima, Tokyo (JP)

(73) Assignee: FujiFilm Corporation, Tokyo (JP)

( * ) Notice: Subject to any disclaimer, the term of this patent is extended or adjusted under 35 U.S.C. 154(b) by 463 days.

(21) Appl. No.: 11/296,468

(22) Filed: Dec. 8, 2005

(65) Prior Publication Data
US 2006/0087568 A1 Apr. 27, 2006

Related U.S. Application Data

(62) Division of application No. 09/785,413, filed on Feb. 20, 2001, now Pat. No. 7,327,387.

(30) Foreign Application Priority Data

Feb. 21, 2000 (JP) .............................. 2000-043140
Mar. 21, 2000 (JP) .............................. 2000-078715

(51) Int. Cl.
*H04N 5/225* (2006.01)
*H04N 5/232* (2006.01)

(52) U.S. Cl. ............................. 348/207.99; 348/211.2

(58) Field of Classification Search .................. None
See application file for complete search history.

(56) References Cited

U.S. PATENT DOCUMENTS 5,848,420 A 12/1998 Xu
5,899,581 A 5/1999 Kawamura et al.
5,914,787 A 6/1999 Satoh et al.
5,999,697 A 12/1999 Murase et al.

(Continued)

FOREIGN PATENT DOCUMENTS

JP 5-219422 8/1993

(Continued)

OTHER PUBLICATIONS

Japanese Office Action dated Apr. 25, 2006 with full English translation.

*Primary Examiner*—Justin P Misleh
(74) *Attorney, Agent, or Firm*—McGinn IP Law Group, PLLC

(57) ABSTRACT

To provide a pull model which can remotely control an image pick-up device by connecting the image pick-up device to an image information receiver through a communication path and operating a general purpose file reading program by the image information receiver. The image pick-up device includes: a communicating unit capable of transmitting and receiving information to/from the image information receiver; and an information processing unit for instructing the information of directories in which the file names of functions indicating at least a function for picking up an image are registered to be transmitted to the image information receiver through the communicating unit. The information processing unit transmits an image file obtained by picking up the image to the image information receiver through the communicating unit, so that the image pick-up device can be easily remotely controlled from the image information receiver.

51 Claims, 16 Drawing Sheets

U.S. PATENT DOCUMENTS

| | | |
|---|---|---|
| 6,373,507 B1 * | 4/2002 | Camara et al. ............... 715/825 |
| 6,525,761 B2 | 2/2003 | Sato et al. |
| 6,698,021 B1 | 2/2004 | Amini et al. |
| 6,784,925 B1 * | 8/2004 | Tomat et al. ........... 348/207.11 |
| 6,889,364 B2 | 5/2005 | Camara et al. |
| 6,930,709 B1 | 8/2005 | Creamer et al. |
| 6,937,356 B1 | 8/2005 | Ito et al. |
| 6,947,075 B1 | 9/2005 | Niikawa |
| 6,954,280 B1 * | 10/2005 | Kaibara ..................... 358/1.15 |
| 7,034,880 B1 | 4/2006 | Endsley et al. |
| 7,327,387 B2 * | 2/2008 | Tanaka et al. .......... 348/207.99 |

| | | |
|---|---|---|
| 2002/0090208 A1 | 7/2002 | Hatanaka |

FOREIGN PATENT DOCUMENTS

| | | |
|---|---|---|
| JP | 6-217183 | 8/1994 |
| JP | 8-251317 | 9/1996 |
| JP | 9-261619 | 10/1997 |
| JP | 10-271370 | 10/1998 |
| JP | 10-290470 | 10/1998 |
| JP | 11-220616 | 8/1999 |
| JP | 2000-013669 | 1/2000 |

* cited by examiner

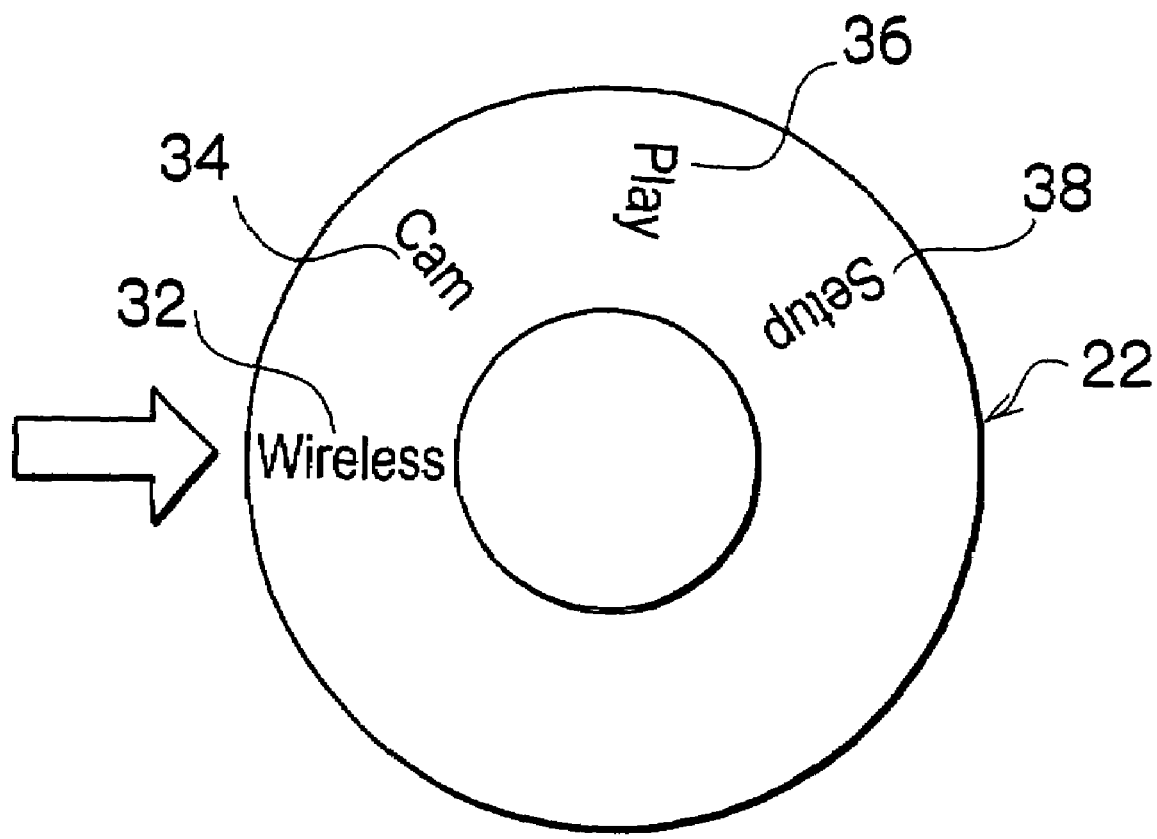
F I G. 2

SETUP
DATE/TIME: 99/12/14 12:00:00
SHOOTING MODE: FINE [NORMAL] ECONOMY
NUMBER OF PIXEL: VGA(640 x 480) [XGA(1024 x 768)]
AUTO-OFF: 2mm
ALARM-ON: LARGE [SMALL] NONE

F I G. 9
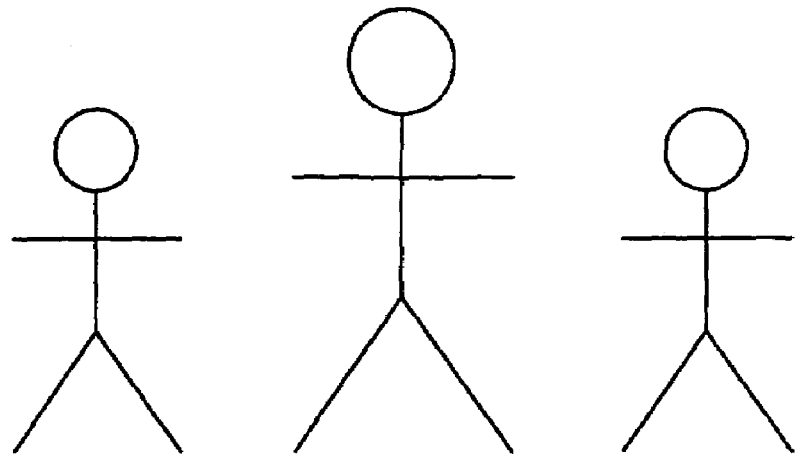

F I G. 1 1
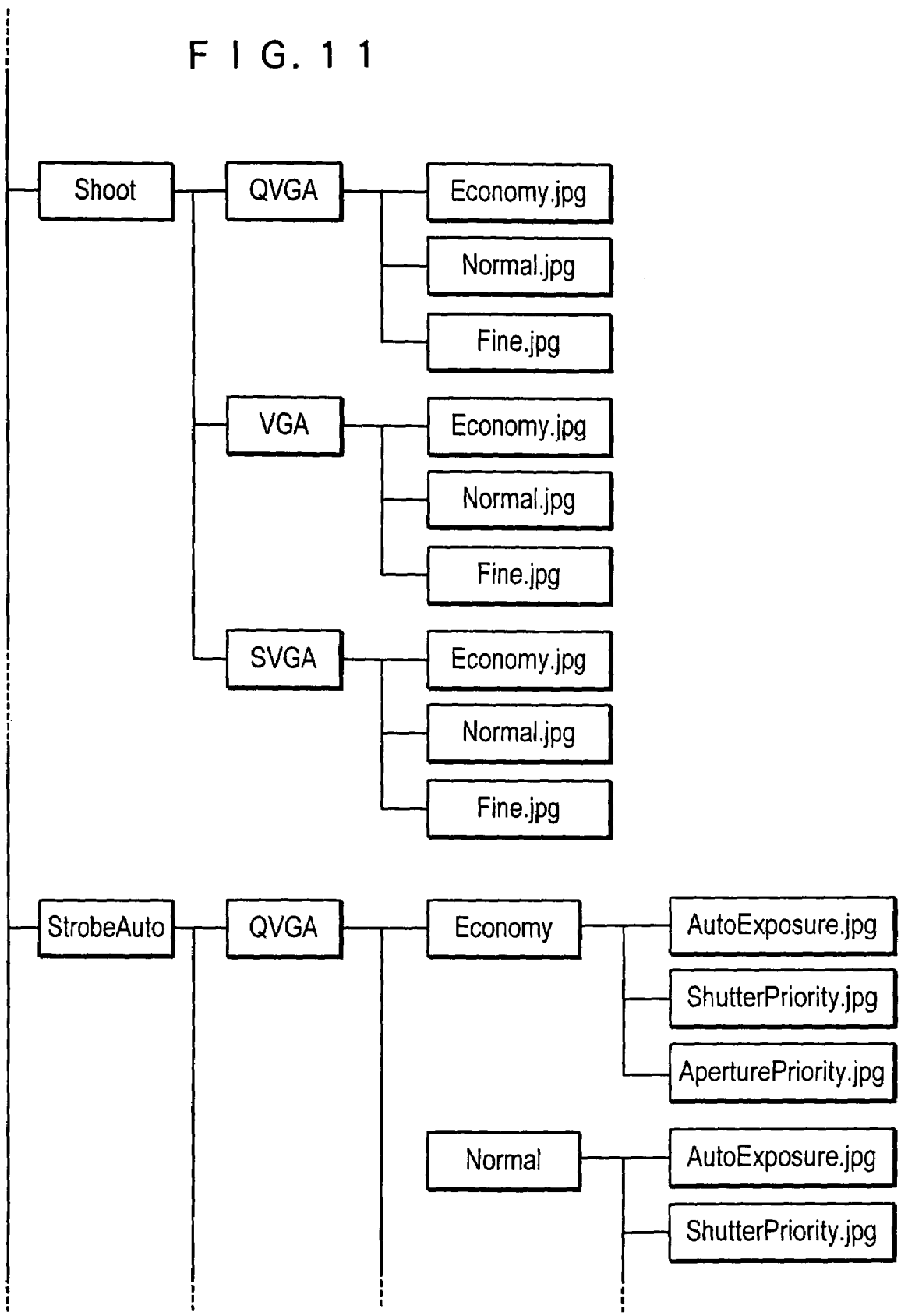

FIG. 12

| CurrentFolder | "¥" | |
|---|---|---|
| FolderList{ | | |
| "001Vacantion" | /D | |
| "002Birthday" | /D | |
| "Shoot.jpg" | /F | /S=200KB |
| "LastShot.jpg" | /F | /S=195KB |
| "StrobeAuto" | /D | |
| "StrobeOn" | /D | |
| "StrobrOff" | /D | |
| "Autoexposure" | /D | |
| "ShutterPriority" | /D | |
| "AperturePriority" | /D | |
| } | | |

FIG. 15
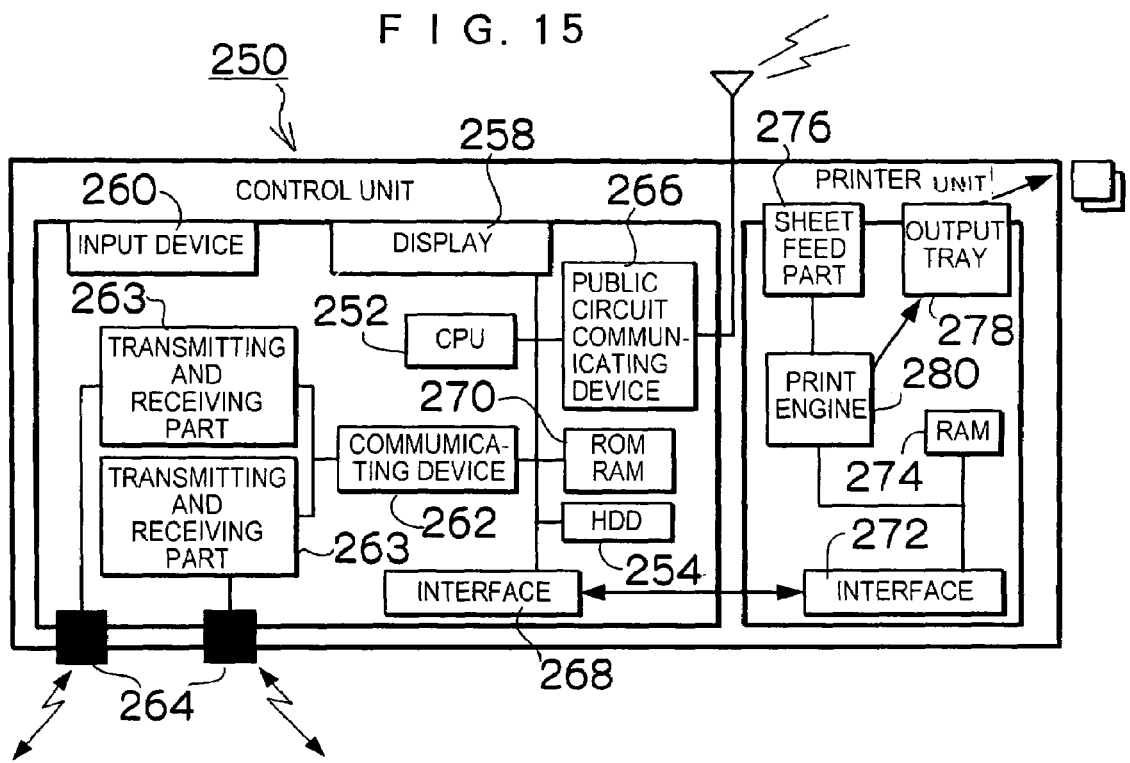
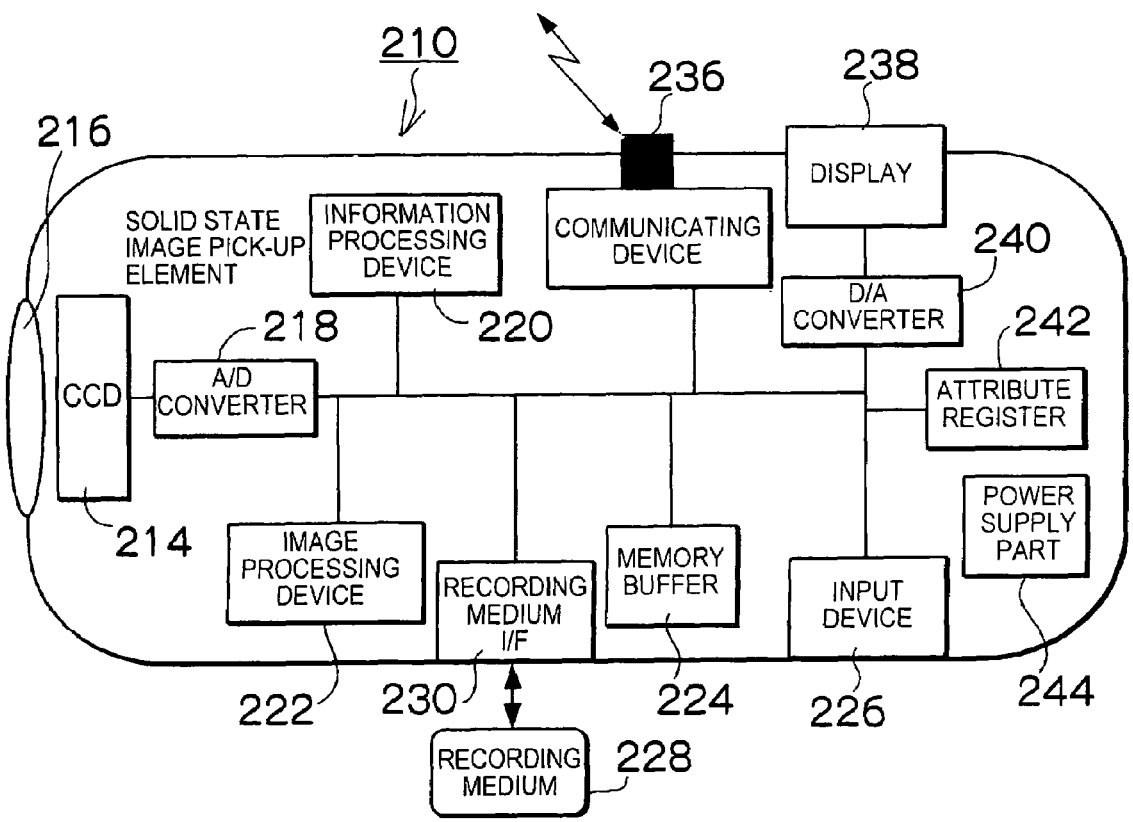

F I G. 1 6
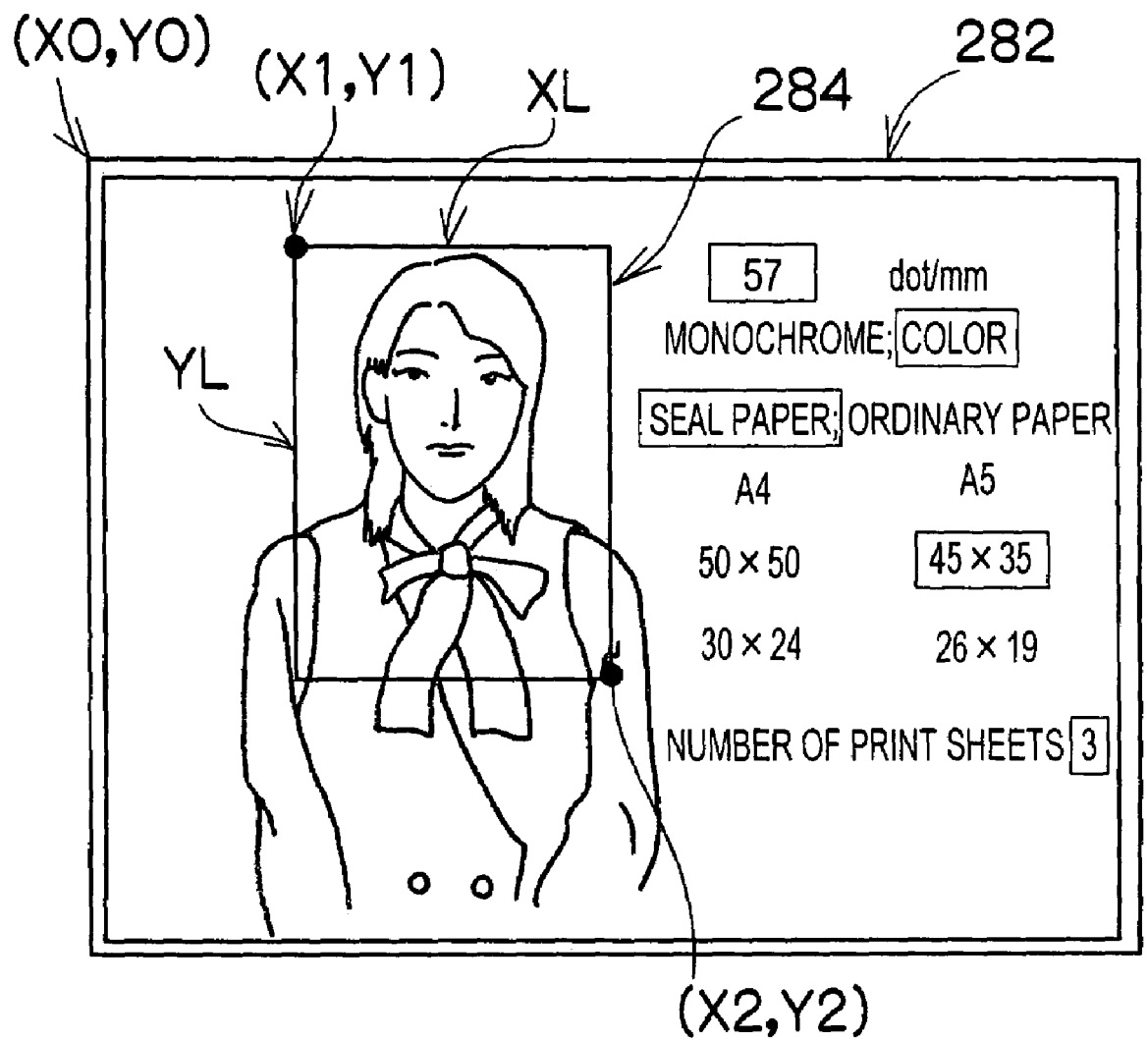

IMAGE OBTAINING METHOD, IMAGE PICK-UP DEVICE, IMAGE PICK-UP INFORMATION TRANSMITTING SYSTEM, IMAGE TRANSMITTER AND PRINT SYSTEM

The Present Application is a Divisional Application of U.S. patent application Ser. No. 09/785,413 filed on Feb. 20, 2001, and issued as U.S. Pat. No. 7,327,387 B2 on Feb. 5, 2008.

BACKGROUND OF THE INVENTION

1. Field of the Invention

The present invention relates to an image obtaining method, an image pick-up device and an image pick-up information transmitting system, and more particularly to an image obtaining method, an image pick-up device and an image pick-up information transmitting system capable of obtaining under a remote control an image from other communication devices connected by a communication.

Further, the present invention relates to an image transmitter and a print system, and more particularly to an image transmitter and a print system for editing the image inputted by the image transmitter and transmitting an edited print image to a printer.

2. Description of Related Art

An image pick-up system, an electronic camera and a computer system for controlling the electronic camera and a control method for them in which the control parameters of the electronic camera such as an exposure, various kinds of balance controls, etc. can be set by a host computer side connected thereto by a communication path are disclosed in Japanese Patent Application Laid-Open No. 5-219422.

On the other hand, the electronic camera in which an image picked up by the electronic camera is directly transmitted to a printer by a wireless communication to instruct the image to be printed has been hitherto known.

Further, Japanese Patent Application Laid-Open No. 9-261619 discloses a monitor system of a construction site in which the state of a construction work site is shot by a television camera, and its static image is transmitted by the wireless communication network of a portable telephone and a receiving part displays the received static image by a monitor television, records the image by an image recording video recorder and the recorded image is printed out by a printer.

The image pick-up system, the electronic camera and the computer system for controlling the electronic camera and the control method for them disclosed in the Japanese Patent Application Laid-Open No. 5-219422 are adapted to remotely control the electronic camera from the computer connected to the electronic camera, and therefore, the parameters upon picking up an image can be set and an image picking-up operation can be performed by the electronic camera and the picked-up image can be obtained from the electronic camera. However, in order to set various kinds of parameters of the electronic camera and obtain the picked-up image from the electronic camera, it has been necessary to previously provide a dedicated command for the computer.

In the case where the computer to which the electronic camera is connected is an apparatus employed only for controlling the electronic camera, it does not cause any trouble. However, for instance, in the case where the electronic camera is connected to a personal computer, a PDA (personal digital assistant), a portable telephone, etc., these devices to which the electronic camera is connected need to previously have dedicated commands for controlling the electronic camera. Since the control method for the electronic camera is not ordinarily a generalized using method of each device to which the electronic camera is connected, it has been a utilization method unfamiliar to a user and the user has needed to forcedly make a troublesome setting such as the installation of a device driver only for controlling the electronic camera. Especially, in the case each device to which the electronic camera is connected is a small communication device such as a portable telephone or the like, it has been disadvantageously difficult to meet the device in view of the configuration of a hardware due to a condition under which resources for storing the device driver or performing an information processing are limited.

Further, since in the control mode of a computer connected to the conventional electronic camera, an image pick-up mode is completely separated from the transfer mode of an image, a computer side cannot inconveniently instruct an image to be freely picked up.

Still further, in the case where the computer side instructs an image to be obtained, there has been hitherto only a function for obtaining the picked up image which is recorded in the electronic camera, so that the computer side cannot instruct a continuous operation for picking up an image and obtaining the picked up image. Therefore, an operation has been undesirably complicated.

On the other hand, in the case where the conventional electronic camera instructs the recorded image to be transmitted to a printer by a wireless communication and to be printed, the electronic camera only can inconveniently instruct one sheet of the image to be directly printed. Therefore, when a plurality of sheets of the same images are printed, it has been necessary to transmit the required number of sheets of images. Further, when a trimming operation is performed on the image, the image data of an area which is not actually printed has been also transmitted to the printer and the trimming processing has been applied to the area of the image data from the printer side. Therefore, a useless transmitting time has been required.

Furthermore, the monitor system disclosed in the Japanese Patent Application Laid-Open No. 9-261619 also cannot transmit the edited print image from the television camera of a transmitting side or the portable telephone side.

SUMMARY OF THE INVENTION

The present invention has been achieved in view of these circumstances and it is an object of the present invention to provide an image obtaining method, an image pick-up device and an image pick-up information transmitting system capable of controlling the image pick-up operation of an image pick-up device, setting control parameters, and remotely controlling such as transferring a picked-up image without mounting control commands dedicated to the image pick-up device on an image information receiver by connecting the image pick-up device to the image information receiver through a communication path.

Further, with the above described problems taken into consideration, it is another object of the present invention to provide an image transmitter and a print system which can edits an input image, generates a print image from information required for printing, transmits the print image to a printer and print a desired image in a short time.

For attaining the above described objects, the present invention is directed to an image obtaining method in which an image information receiver selects a name of a desired file on the basis of the information of a directory presented from an image pick-up device and receives an image file of the selected file name, wherein: the image pick-up device has functions for picking up an image upon request for a file and transmitting an image file obtained upon picking up the image and transmits the information of a directory in which the names of function files indicating at least the functions are registered to the image information receiver; the image information receiver selects the name of a desired function file on the basis of the transmitted information of the directory to request the image pick-up device to send an image file corresponding to the function file name; the image pick-up device performs a function allocated to the function file name in accordance with the request for the file; and the image information receiver receives the image file transmitted in accordance with the execution of the function allocated to the function file name.

According to the present invention, since the image pick-up device has functions for picking up an image upon request for a file and transmitting an image file obtained upon picking up the image and transmits the information of a directory in which the names of function files indicating at least the functions are registered to the image information receiver; the image information receiver selects the name of a desired function file on the basis of the transmitted information of the directory to request the image pick-up device to send an image file corresponding to the function file name; the image pick-up device performs a function allocated to the function file name in accordance with the request for the file; and the image information receiver receives the image file transmitted in accordance with the execution of the function allocated to the function file name, the image pick-up device can be easily remotely controlled from the image information receiver.

Further, in order to attain the above described objects, the present invention is directed to an image pick-up device, comprising: a communicating device which transmits and receives information to and from an image information receiver for receiving an image file; an information processing device which instructs the information of directories in which the file names of functions indicating at least a function for picking up an image are registered to be transmitted to the image information receiver through the communicating device; and an image pick-up device which picks up an image allocated to the function file name when the image information receiver requests to transmit a file corresponding to the function file name, wherein the information processing device transmits the image file obtained by picking up the image to the image information receiver through the communicating device.

According to the present invention, since the image pick-up device includes a communicating device for transmitting and receiving information to/from an image information receiver for receiving an image file; an information processing device for instructing the information of directories in which the file names of functions indicating at least a function for picking up an image are registered to be transmitted to the image information receiver through the communicating device; and an image pick-up device for picking up an image allocated to the function file name when the image information receiver requests to transmit a file corresponding to the function file name, in which the information processing device transmits the image file obtained by picking up the image to the image information receiver through the communicating device, the image pick-up device can be readily remotely controlled from the image information receiver.

Further, in order to attain the above described objects, the present invention is directed to an image pick-up information transmitting system, comprising: a communicating device capable of transmitting and receiving information to and from an image information receiver for receiving an image file; an information processing device which instructs the information of directories in which the file names of functions indicating at least a function for picking up an image are registered to be transmitted to the image information receiver through the communicating device; and an image pick-up device which picks up an image allocated to the function file name when the image information receiver requests to transmit a file corresponding to the function file name, wherein: the information processing device comprises: an image pick-up device which transmits an image file obtained by picking up the image to the image information receiver through the communicating device; a first communicating device capable of transmitting and receiving the information to and from the image pick-up device; a display for displaying the information of the directories presented from the image pick-up device; and a selecting device which selects and designates a desired function file name showing a desired function on the basis of the displayed information of the directories.

According to the present invention, since the image pick-up information transmitting system includes: a communicating device capable of transmitting and receiving information to/from an image information receiver for receiving an image file; an information processing device for instructing the information of directories in which the file names of functions indicating at least a function for picking up an image are registered to be transmitted to the image information receiver through the communicating device; and an image pick-up device for picking up an image allocated to the function file name when the image information receiver requests to transmit a file corresponding to the function file name; wherein the information processing device comprises an image pick-up device for transmitting an image file obtained by picking up the image to the image information receiver through the communicating device; a first communicating device capable of transmitting and receiving the information to/from the image pick-up device; a display for displaying the information of the directories presented from the image pick-up device; and a selecting device for selecting and designating a desired function file name showing a desired function on the basis of the displayed information of the directories, the image pick-up device can be easily remotely controlled from the image information receiver, in which the image can be obtained and the obtained image can be transmitted to other communication devices.

For attaining the above described objects, the present invention is directed to an image transmitter for transmitting a print image to a printer, comprising: an image input device which picks up or inputting an image; a deciding device which decides whether or not the image size of the input image thus inputted or an edited image obtained by editing the input image is larger than an image size required for printing by the printer; an image processing device which resizes the size of the input image or the edited image so as to be an image size required for printing to generate the print image when it is decided that the image size is larger by the deciding device; and a communicating device which transmits the input image or the edited image to the printer as the print image when it is decided that the image size of the input image or the edited image is not larger by the deciding device, and transmits the print image generated by the image processing device to the printer when it is decided that the size of the input image or the edited image is larger.

According to the present invention, since the image transmitter for transmitting a print image to a printer includes an image input device for picking up or inputting an image; a deciding device for deciding whether or not the image size of the input image thus inputted or an edited image obtained by editing the input image is larger than an image size required for printing by the printer; an image processing device for resizing the size of the input image or the edited image so as to be an image size required for printing to generate the print image when it is decided that the image size is larger by the deciding device; and a communicating device for transmitting the input image or the edited image to the printer as the print image when it is decided that the image size of the input image or the edited image is not larger by the deciding device, and transmitting the print image generated by the image processing device to the printer when it is decided that the size of the input image or the edited image is larger, image data to be transferred is minimized as required, a communication time is reduced and a desired image can be printed in a short time.

In order to attain the above described objects, the present invention is directed to a print system, comprising: an image transmitter including: an image input device which picks up or inputs an image, a first display which displays the inputted image, a first input device which inputs and sets print information upon printing the displayed image, a deciding device which decides whether or not the size of the input image thus inputted or an edited image obtained by editing the input image on the basis of the print information is larger than an image size required for printing by a printer, an image processing device which resizes the size of the input image or the edited image so as to be an image size required for printing to generate a print image when the deciding device decides that the image size is larger, and a first communicating device which transmits the input image or the edited image and the print information when it is decided that the size of the input image or the edited image is not larger by the deciding device, and transmits the print image generated by the image processing device and the print information to the printer when it is decided that the size of the input image or the edited image is larger; and a printer including a second communicating device which receives the image and the print information transmitted from the first communicating device, a second display which displays at least the print information, and a print device which prints the image on the basis of the received image or the received image and the print information.

According to the present invention, since the print system including: an image transmitter including an image input device for picking up or inputting an image; a first display for displaying the inputted image; a first input device for inputting and setting print information upon printing the displayed image; a deciding device for deciding whether or not the size of the input image thus inputted or an edited image obtained by editing the input image on the basis of the print information is larger than an image size required for printing by a printer; an image processing device for resizing the size of the input image or the edited image so as to be an image size required for printing to generate a print image when the deciding device decides that the image size is larger, and a first communicating device for transmitting the input image or the edited image and the print information when it is decided that the size of the input image or the edited image is not larger by the deciding device, and transmitting the print image generated by the image processing device and the print information to the printer when it is decided that the size of the input image or the edited image is larger; and a printer including a second communicating device for receiving the image and the print information transmitted from the first communicating device, a second display for displaying at least the print information, and a print device for printing the image on the basis of the received image or the received image and the print information, in which image data to be transferred may be minimized as required, a communication time can be shortened and a desired image can be printed in a short time.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a diagram showing a display of various kinds of modes provided in a mode switching dial;

FIG. 4 is a diagram showing the contents of a display shown when the electronic camera is set to a set-up mode;

FIG. 9 is a diagram showing an internal structure of an image file;

FIG. 11 is a diagram showing paths of virtual directory names classified into parameters indicating image pick-up conditions and parameters indicating properties of the image and virtual file names in a tree structure representation;

FIG. 12 is a diagram showing a description example of information of directories to be transmitted to an image information receiver from the image pick-up device;

FIG. 15 is a block diagram showing an embodiment of an image transmitter and a print system according to the present invention; and FIG. 16 is a diagram showing a trimming process of a picked-up input image and print order information.

DETAILED DESCRIPTION OF THE PREFERRED EMBODIMENT

Now, referring to the accompanying drawings, a preferred embodiment of an image obtaining method, an image pick-up device and an image pick-up information transmitting system according to the present invention will be described in detail hereinafter.

Figure 1:
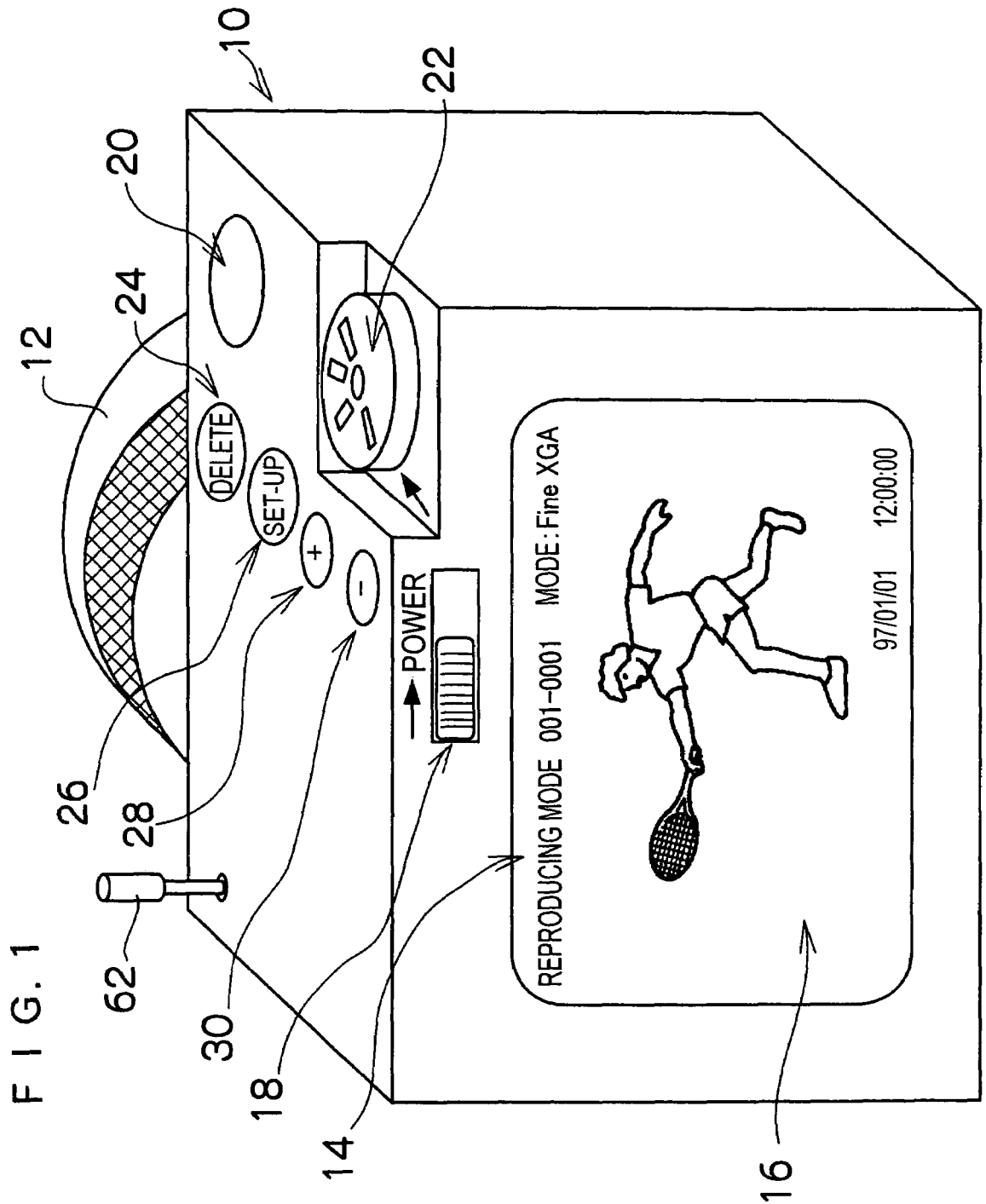
FIG. 1 is an external perspective view of an image pick-up device.

FIG. 1 is an external perspective view of an image pick-up device.

Referring to FIG. 1, an electronic camera 10 (image pick-up device) comprises an image pick-up lens 12 for forming the image of an object to be shot on an image pick-up device, a display 16 for displaying various kinds of information such as an image data or frame number display 14, a power switch 18 for starting or stopping the functions of the electronic camera 10, a release button 20 for instructing an image to be picked up by a user, a mode switching dial 22 provided in the electronic camera 10 for switching and setting various kinds of modes, an erasing button 24 designated when a desired item is erased from items displayed on the display 16, a setting button 26 for registering a desired item from the items displayed on the display 16, an increment button 28 operated upon incrementing the frame number or the like displayed on the display 16 and a decrement button 30 operated upon decrementing the frame number or the like displayed on the display 16.

Further, there is provided an antenna 62 for transmitting and receiving a carrier or data so as to transmit and receive information such as image data to/from an external device.

FIG. 2 is a diagram showing the display of various kinds of modes provided in the mode switching dial 22.

In FIG. 2, the mode switching dial 22 is provided with a communication mode 32 (described as Wireless in FIG. 2) for performing a communication with other communication devices (such as an image information receiver or the like), an image pick-up mode 34 for picking up an image, a reproducing mode 36 for reproducing recorded images and a setup mode 38 for setting dates, the number of pixels of picked-up images, the auto-off time of a power and the volume of an alarm sound or the like.

Figure 3:
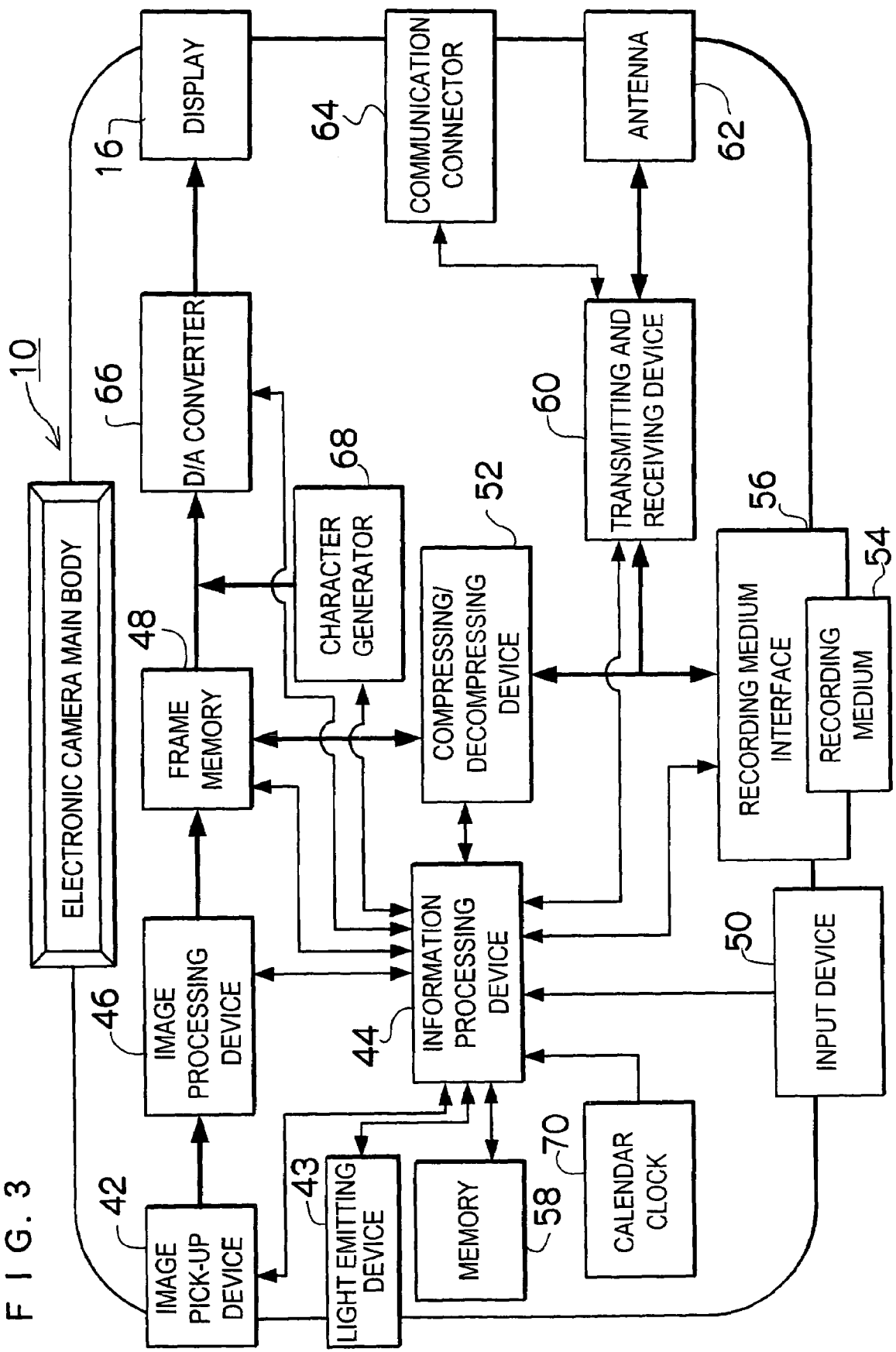
FIG. 3 is a block diagram of a signal processing system of an electronic camera.

FIG. 3 is a block diagram of a signal processing system of the electronic camera.

The electronic camera 10 is provided with the image pick-up device or shooting device 42 for forming the image of an object to be shot on a photo-receiving face to perform a photo-electronic conversion and outputting the converted image as image data and a light emitting device 43 for supplementing the brightness of the object to be shot by emitting the light of a flash. The image pick-up device 42 includes a focus adjusting device for focussing the image of the object to be shot on the photo-receiving face, an aperture adjusting part for adjusting an exposure, a shutter speed adjusting device for adjusting an exposure time and a zoom adjusting device for adjusting an angle of view.

The electronic camera 10 is provided with an information processing device 44 (including a function of a converted image generating device) for controlling the entire part of the electronic camera 10, the sampling timing of image data, the light emitting device 43, the exposure including the aperture or the shutter speed or the like, the focus, the zoom, a white balance setting, the recording of the image data, a communication, and a display, the generation of virtual directories (virtual folders), the generation of virtual files, the conversion of the number of pixels of the image data, various kinds of conversion processes of the image data, the setting or canceling of a power conservation mode, etc. To the information processing device 44 are connected to a ROM in which the operation programs of the electronic camera 10, various kinds of constants, parameters indicating image pick-up conditions, parameters indicating the properties of the image, information related to the virtual directories and information related to the virtual files or the like are stored and a memory 58 composed of a RAM as storing means which forms an operation area when the programs are executed.

Further, in the electronic camera 10, are provided an image processing device 46 for performing processes for changing the number of pixels, correction a sharpness, correcting gamma, correcting a contrast, correcting a white balance, etc., a frame memory 48 for temporarily storing the image data, an input device 50 including the release button 20, the erasing or delete button 24, the setting button 26, the increment button 28, the decrement button 30, or the like, a compressing and decompressing device 52 (including the function of the converted image generating device) for performing a compression control of information such as the image data by using a method represented by JPEG or MPEG, and performing a process of expansion and development control of compressed data in accordance with the instruction of the information processing device 44, and an recording medium interface 56 for converting data in order to record or read out the image data on/from a detachable recording medium 54. The recording medium 54 is detachable recording means represented by semiconductors such as memory cards and MOs, magnetic recording and optical recording.

The wireless communicating device of the electronic camera 10 employed when the image data is transmitted to and received from other device comprises a transmitting and receiving device 60 for encoding and decoding the image data or the information data of the directories or the like and transmitting or receiving the data on a carrier wave in accordance with a command from the information processing device 44, the antenna 62 for transmitting and receiving the carrier wave and the data and a communication connector 64 for connecting together the mutual devices for transmitting and receiving the information such as the image data through a cable to perform a communication by a wired communication. Through the communicating device configured as described above, the data stored in the image files, the RAM, the ROM and the frame memory 48 can be transmitted to other communication devices or the information can be received from other communication devices to store in each storing device.

Further, when the information is transmitted to and received from other communication device through the connector 64, the mutual devices for transmitting and receiving the information are connected together through the cable to convert the information into an electric signal or an optical signal and perform a wired communication.

Further, the electronic camera 10 is provided with a D/A converter 66 for displaying the image data on the display 16, a character generator 68 for converting code information commanded from the information processing device 44 into the data of characters or messages to be displayed and a calendar clock 70 for ticking dates or time.

Furthermore, when a command to inquire the directory structure and the file information of the image data in relation to the image pick-up conditions or the transfer of the image data is received from other communication device (such as the image information receiver) by communication, the information processing device 44 transmits the information of the directories in which the names of files classified for each of the parameters indicating the image pick-up conditions or the parameters indicating the properties of the image to the image information receiver. The information of the directories constituting classification information is composed of information including a virtual directory (including a virtual folder) and a virtual image file or the name of a path of a virtual image file or the like. The information may be previously stored in the ROM (a storing device) or may be generated on the basis of the image pick-up conditions provided in the electronic camera 10 or the properties of the image which can be converted.

With reference to FIG. 4, the contents of a display shown in the display 16 when the mode of the electronic camera 10 is set to the setup mode are shown.

In the same figure, when the setup mode 38 is set, a display is made to change date and time, change the image pick-up or shooting mode, change the number of pixels of a recorded image. Set an auto-off time, and adjust the volume of an alarm sound. These settings can be changed by operating the input device 50 provided for the electronic camera 10.

Further, the display of a date and time represents the date and time which the calendar clock 70 is currently ticking, and when a user performs a selection for changing numeric values to change the numeric values, the information of the inputted date and time is transferred to the calendar clock 70 from the information processing device 44 to start ticking the inputted date and time.

For the image pick-up or shooting mode displayed on the display 16, are represented various image pick-up or shooting modes of "FINE", "NORMAL", "ECONOMY" whose image data compressibilities are different from one another. In the case of an example in FIG. 4, the "FINE" mode is a setting largest in its quantity of image data and low in its compressibility.

As for the number of pixels of the recorded image, the number of pixels (resolution) of VGA (640×480) and XGA (1024×768) is shown. Accordingly, when a high image quality print is performed, a recording is carried out in advance under the conditions of the large number of pixels and a low compressibility. Further, when the image data is applied to a use for transferring it to other communication device, the quantity of image data is set in accordance with the use when the use is predetermined by performing a recording operation with the small number of pixels and high compressibility and so on.

Further, an auto-off time represents a setting of timeout time, after the lapse of a prescribed time, for automatically entering the power conservation mode (for example, modes for lowering the processing speed of the information processing device 44 and stopping the supply of power to peripheral elements which are not used). When the electronic camera 10 is activated under a state in which the electronic camera 10 enters the power conservation mode, the user operates any of the input device 50 or transmits a command for urging the electronic camera to be activated from other communication device through a communication. A power conservation mode setting device for setting or canceling the power conservation mode may performed by the information processing device 44, or an independent power conservation mode setting device may be provided for an exclusive use.

For setting an alarm sound, the volume of beep sound is set when an alarm is given to the user at the time of activating the electronic camera 10, at the time of completion of a communication process, during an image pick-up or an image shooting operation. These information such as date and time, the image pick-up or shooting mode and the number of pixels of the recorded image are displayed together with the image during reproduction thereof as shown in the display 16 in FIG. 1.

Now, an image pick-up process or a shooting process performed by the electronic camera 10 configured as described above will be described below.

The image of an object to be shot is formed on the photo-receiving face of the image pick-up or shooting device 42. The image of the object to be shot thus formed undergoes a photo-electronic conversion and the converted image is outputted to the image processing device 46. The obtained image data is subjected to an amplification or noise reduction process in the image processing device 46 and the resultant data is stored in the frame memory 48 on a temporary basis. The information processing device 44 transfers the image data stored in the frame memory 48 to the D/A converter 66 one after another to display the image data on the display 16.

When an instruction to pick up or shoot an image is received by pressing the release button 20 provided in the input device 50 or through a communication, a mode for picking up or shooting the image of the object to be shot is started. Then, the information processing device 44 performs an image pick-up or shooting process under a prescribed exposure condition, a flash light emitting condition, a zoom condition and a focus condition as instructed. The image of the object to be shot which is formed on the photo-receiving face of the image pick-up device 42 is subjected to a photo-electronic conversion and the converted image is outputted to the image processing device 46, the image undergoes the amplification or noise reduction process and the resultant image is temporarily stored in the frame memory 48. The information processing device 44 instructs the image data stored in the frame memory 48 to be converted on the basis of a prescribed number of pixels, a compressibility, a sampling method and color information. Then, the information processing device 44 instructs the recording medium interface 56 to sequentially perform a process to record the image data on the recording medium 54 or perform a process to transmit the image data to other devices through the transmitting and receiving device 60.

The information processing device 44 instructs the light emitting device 43 of the quantity of light emission and a light emitting timing in accordance with the prescribed image pick-up or shooting conditions. Further, the image may be picked up or shot at a predetermined zoom position or focus position depending on the image pick-up conditions, or the image pick-up or shooting operation may be performed in accordance with a predetermined white balance condition.

When the picked up image is manually transmitted to other devices, the mode switching dial 22 is set to the communication mode 32 to press a transmitting button provided on the input device 50. Then, the information processing device 44 performs processes for sequentially reading out the designated image data from the recording medium 54 or the frame memory 48, converting the image data into a prescribed data format and then transmitting the converted image data to an external part through the transmitting and receiving device 60, the antenna 62 or the communication connector 64.

Figure 5:
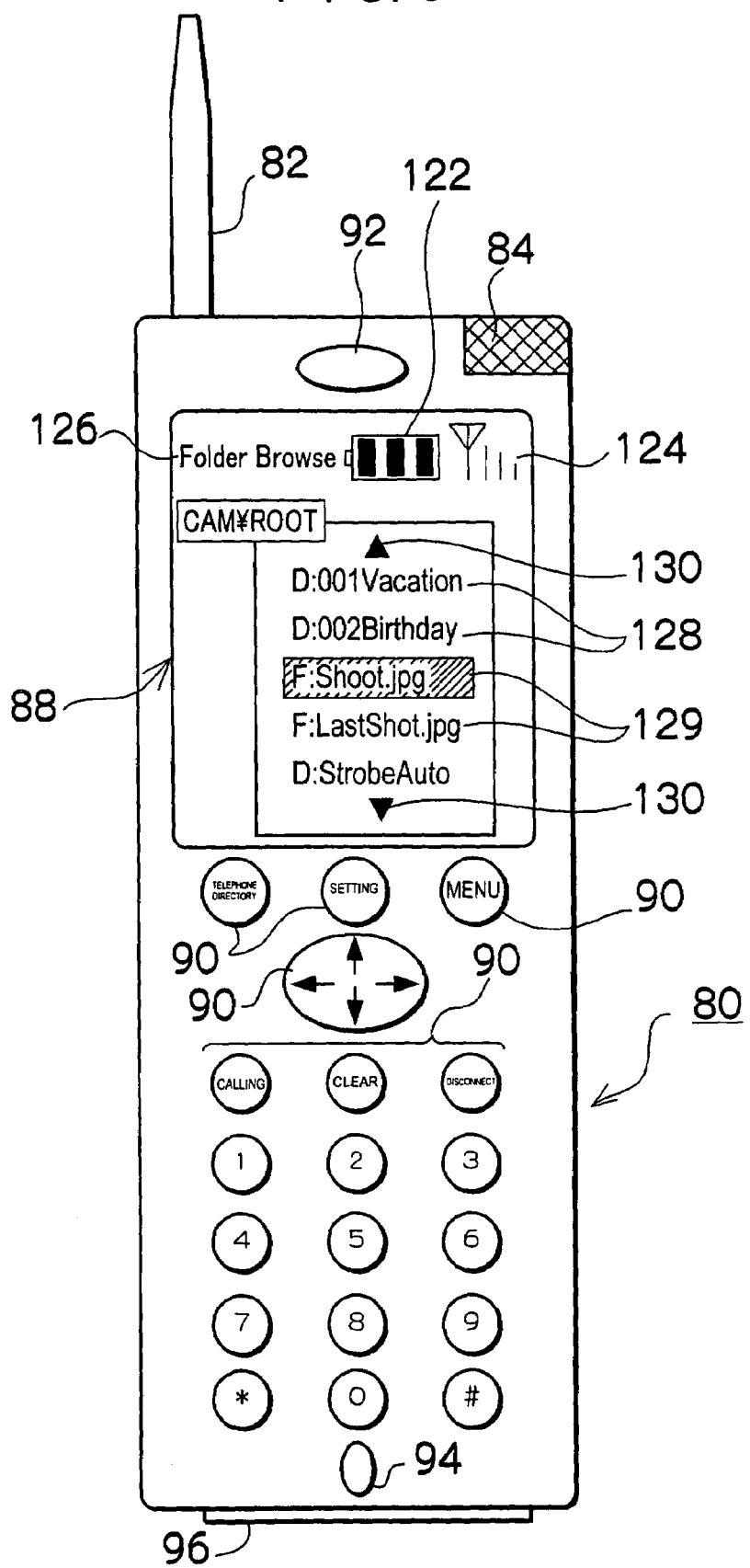
FIG. 5 is an appearance diagram of a communication device.

FIG. 5 is an external appearance view of a communication device.

As shown in the same figure, a communication device 80 (the image information receiver) comprises an antenna 82 for performing a wireless communication with a public circuit, a wireless communicating device 84 for performing a wireless communication with other peripheral communication devices such as the electronic camera, a display 88 composed of a color liquid crystal display or the like for displaying the thumbnail image 86 of communication information or a selected image file, designating devices 90, 90 . . . for designating and selecting the file names of telephone numbers, characters, images and sounds and designating devices or addresses to which the data of the file names are outputted, a speaker 92 serving as a telephone receiver and outputting a sound, a microphone 94 for inputting sounds and a communication connector 96 for performing a wired communication with other peripheral communication devices at an image pick-up position. The communication device 80 may be a device having the above described functions added to a portable telephone. The communicating function of the communication device 80 is not limited to such a communicating function capable of communicating with the electronic camera 10 as a device to be communicated with and may be a generalized communicating function capable of communicating with a computer, an MP3 audio player and other communication devices.

Further, referring to FIG. 5, on the display 88, are displayed a battery remaining capacity display 122 indicating the remaining capacity of the battery which is a power source of the communication device 80, a received radio intensity display 124 for displaying the intensity of wireless received radio, a run mode display 126 for informing a user of a current display mode (Folder Browse mode) and pointers 130, 130 for scrolling and displaying the names of directories 128, 128 . . . displayed on the basis of the information of the directories transmitted from the image pick-up device, the names of files 129, . . . 129 and the names of directories 128 . . . or the names of files 129 which are present in the upper part and the lower part but are not displayed.

When the user designates the run mode or the names of the directories and the names of the files, the user moves a designating frame to perform a setting by using a cursor key or the like provided on the designating device 90. As shown in FIG. 5, in the Folder Browse mode, is displayed "CAM¥ROOT" that shows the root directory of the electronic camera 10 in which a currently displayed directory name 128 (a display character string represented by D: + a directory name like D: 001Vacation) and a file name 129 (a display character string represented by F:+ a file name like F:Shoot.jpg) are stored.

For instance, when the file name 129 of "F:Shoot.jpg" is selected from this display, the communication device 80 sends a command for requesting the electronic camera 10 to transmit the file of "Shoot.jpg". Then, the electronic camera 10 performs an image pick-up operation to transmit the obtained image data by picking up or shooting an image to the communication device 80, so that the communication device 80 can obtains the requested image data.

In this case, if a designation for transmitting the obtained image data to other communication device can be simultaneously performed, a convenient system will be realized. For this purpose, a pull model in which the communication device 80 can get the image from the electronic camera 10 is applicable thereto.

The display program of the Folder Browse mode is not an exclusive program for acquiring the image files from the electronic camera 10 but an ordinary generalized file display program (filer program). Therefore, a personal computer or a digital audio player as well as the electronic camera 10 connected to the communication device through the communicating device can also obtain and transmit the files.

Figure 6:
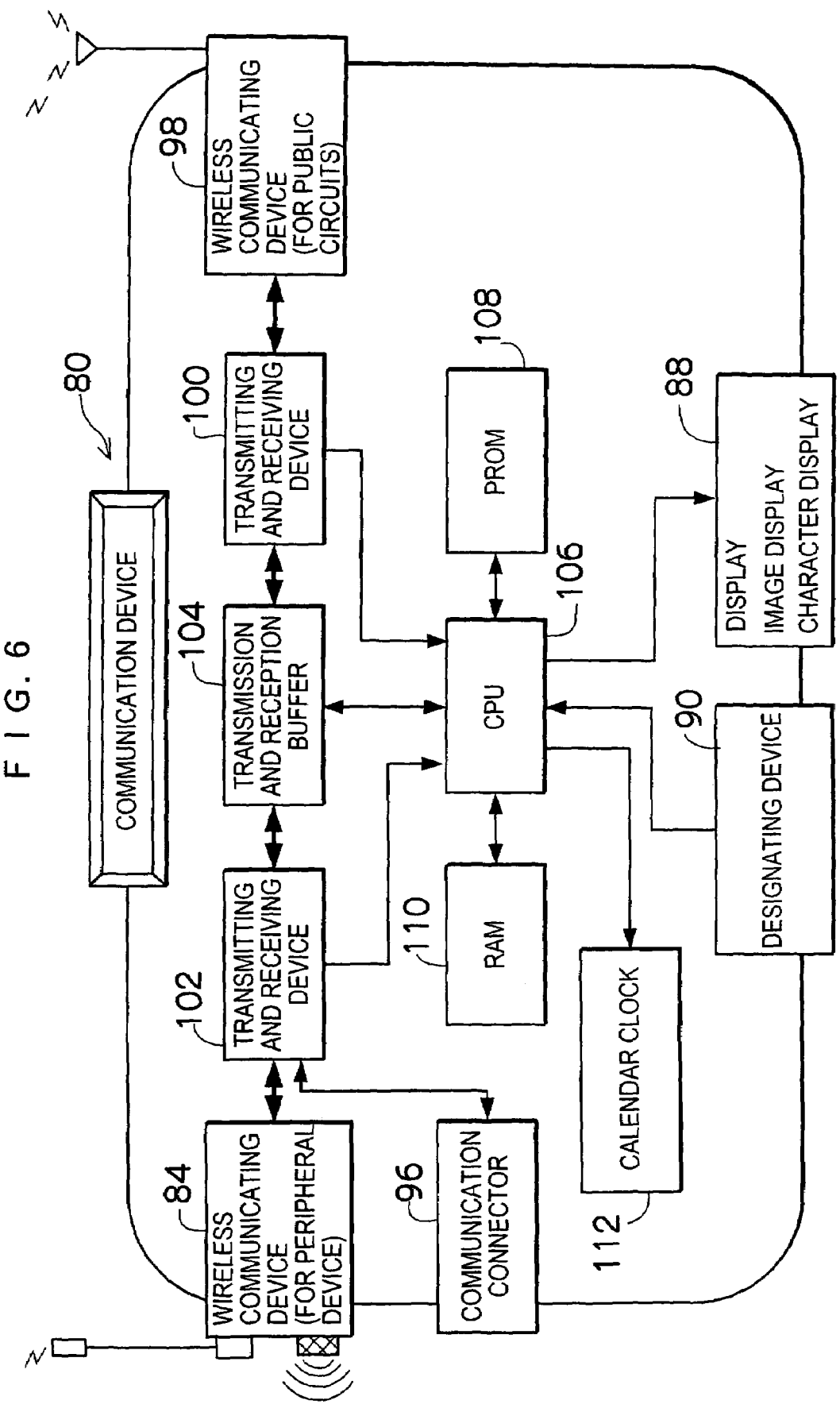
FIG. 6 is a block diagram of a communication processing system of a communication device.

FIG. 6 is a block diagram of a communication processing system of the communication device.

With reference to FIG. 6, the transmitting and receiving part of the communication device 80 comprises a public circuit wireless communicating device 98 for performing a wireless communication to transmit and receive audio information or image data through a public circuit, a public circuit transmitting and receiving device 100, a wireless communicating device 84 for performing a wireless communication with other communication devices, a communication connector 96 for connecting a cable when a wired communication is performed, a transmitting and receiving device 102 and a transmitting and receiving buffer 104 for storing data transmitted and received in real time on a temporary basis.

Further, the communication device 80 is provided with a CPU106 for controlling the entire part of the device, a PROM108 in which a program for operating the CPU106, various kinds of constants, telephone numbers, addresses of communication partners, etc. are written, a RAM 110 as storing means which forms a work area when the CPU106 performs processings, and a calendar clock 112 ticking dates and time.

The CPU106 in the communication device 80 and a peripheral circuit including the display 88 and the designating device 90 are connected together by a communicating device such as a bus line or an I/O, etc. and the CPU106 can control each peripheral circuit.

The communicating device of the wireless communicating device 84 and the electronic camera 10 is communicating means using the light of radio waves, ultrasonic waves, infrared rays or the like for the carrier wave. In the case where the radio wave is employed, specifications of "Bluetooth" and wireless LANs (Local Area Networks) to which an attention has been recently paid may be used. In the case where the infrared ray is employed, an interface device based on the specification of IrDA may be used.

Further, a communicating device when a communication is performed by using a wired communicating device may use a serial communicating device such as RS-232, RS-422, USB. etc., or an interface device using a parallel signal may be employed.

Figure 7:
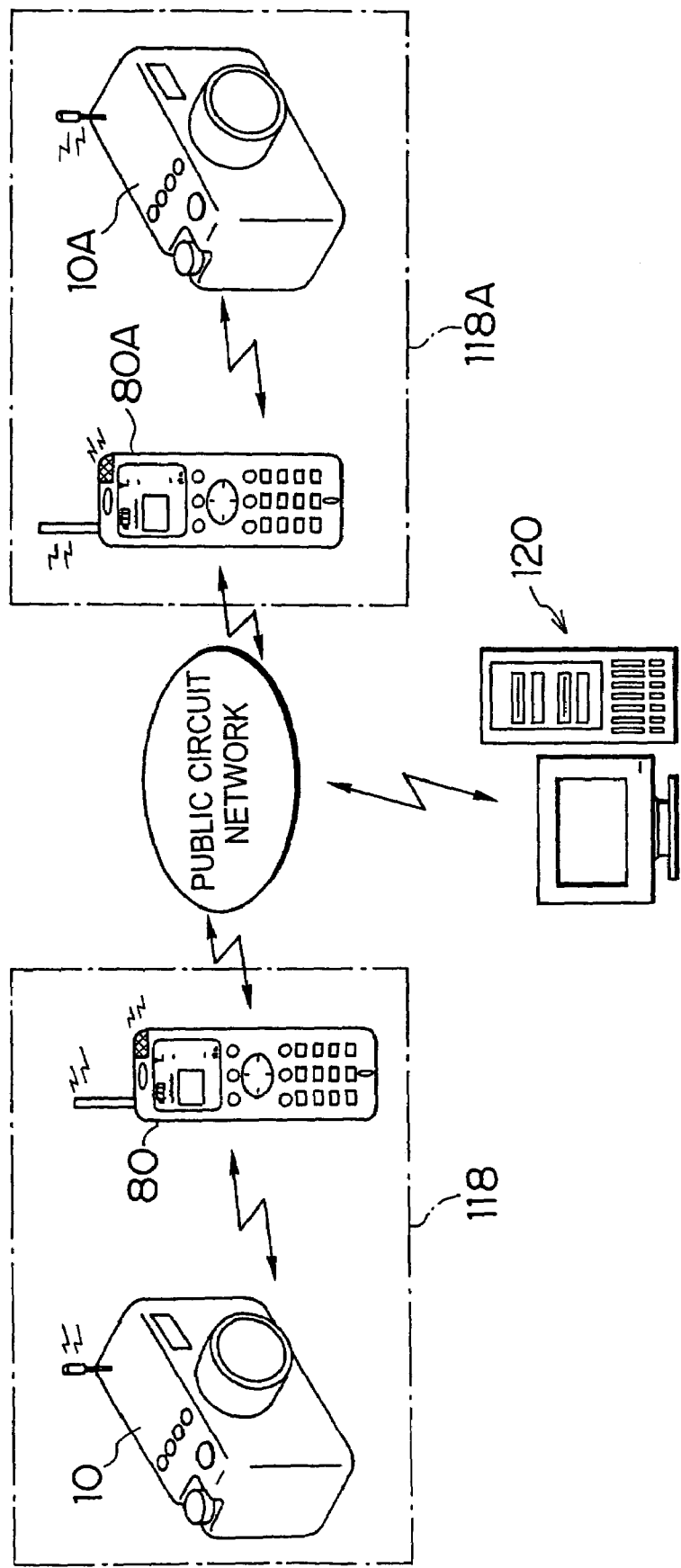
FIG. 7 is a diagram showing the connected configurations of various kinds of communication devices for transmitting and receiving information by using an image pick-up information transmitting system.

FIG. 7 shows configurations of connection of a variety of communication devices in the case where information is transmitted and received by using an image pick-up information transmitting system.

As shown in this figure, the image pick-up information transmitting system 118, 118A comprises the electronic camera 10, 10A and the communication device 80, 80A. The user operates the communication device 80, 80A to select and designate image picked up or shot or stored by the electronic camera 10, 10A and reads out the images. The user further transmits the images to a desired server 120 or other communication devices not shown through the network of the public circuit. The server 120 may perform a service to print the images on sheets of paper based on the transmitted image information and deliver them to the user.

Further, a communication network such as the public circuit and a short-range communication network to communicate with the communication device located in the vicinity of the communication device 80 are simultaneously activated, so that while the communication device 80 receives the image data from the electronic camera 10, it can transmit the image data which is being received to the server 120.

Figure 8:
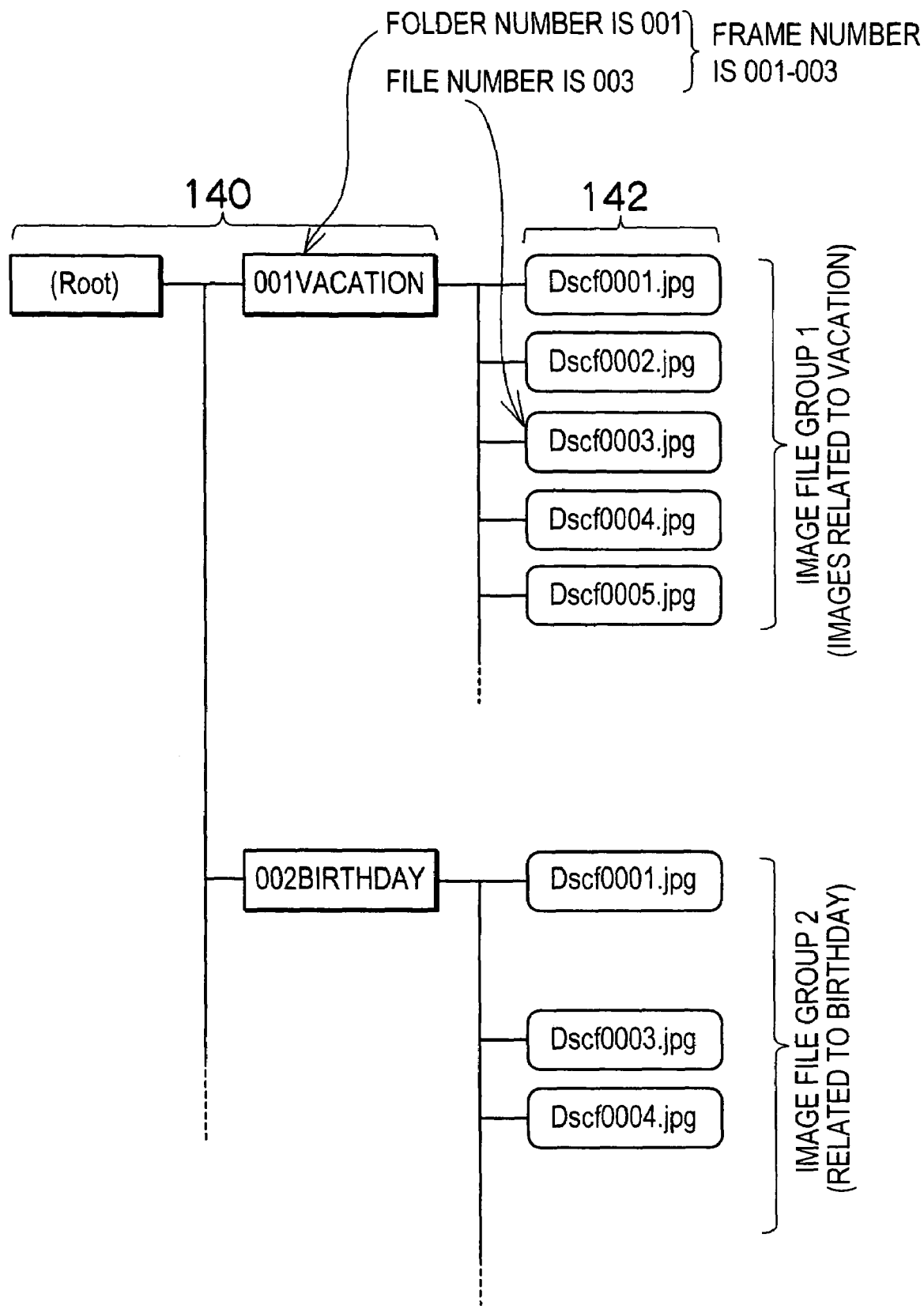
FIG. 8 is a diagram showing a structure of recording directories of image files in the electronic camera.

A recording directory structure of the image file in the recording medium 54 of the electronic camera 10 is shown in FIG. 8.

In this figure, the directory structure of the file of the image picked up or shot comprises a root "ROOT", each directory group 140 showing a section "001Vacation" indicating an image picked up or shot during the holidays of a user and "002Birthday" and each image file group 142 of "Dscf0001.jpg", "Dscf0002.jpg" . . . The above described directory names are generally represented by "nnnXXX . . . X", numeric characters indicating the directory numbers of 001 to 999 are applied to nnn and arbitrary alphabetical names are applied to XXX . . . X. Further, the file name is generally represented by "Dscfmmmm.jpg". Dscf designates an identifier for indicating the file of the image picked up or shot by the electronic camera. mmmm designates file numbers from 0001 to 9999. jpg designates an identifier for indicating the image data recorded by a compressing method of JPEG system.

The path of the image file can be expressed by numeric characters of seven digits of nnn-mmmmm by using the above described directory numbers and the file numbers (refer to the display "001-0001" of the display 16 shown in FIG. 1).

FIG. 9 shows an internal structure of the image file.

In this figure, the image file comprises a tag 144 in which information attached to the image such as the image pick-up or shooting conditions is described, a Thumbnail 146 as image data for a heading and a main image 148. In a tag 144, are attached and described shooting dates, whether or not a flash is used, the state of an exposure mode (set on the basis of an aperture priority in an example shown in FIG. 9), a set white balance (set on the basis of daylight in an example shown in FIG. 9), titles, focus information, image pick-up or shooting position information obtained when GPS devices are connected. When the values of these information are not unknown, it is also possible to describe "UNKNOWN".

The Thumbnail 146 has image data of the main image 148 whose number of pixels (the number of pixels of VGA or XGA) is reduced to about 160×120 as a heading attached thereto and stored therein. In the main image 148, each of the number of pixels with VGA, XGA or the like designated and the information of the image data compressed with a prescribed compressibility are recorded. The Thumbnail 146 is not limited to the form shown in FIG. 9 and a plurality of image information whose number of pixels are different mutually may be recorded.

Figure 10:
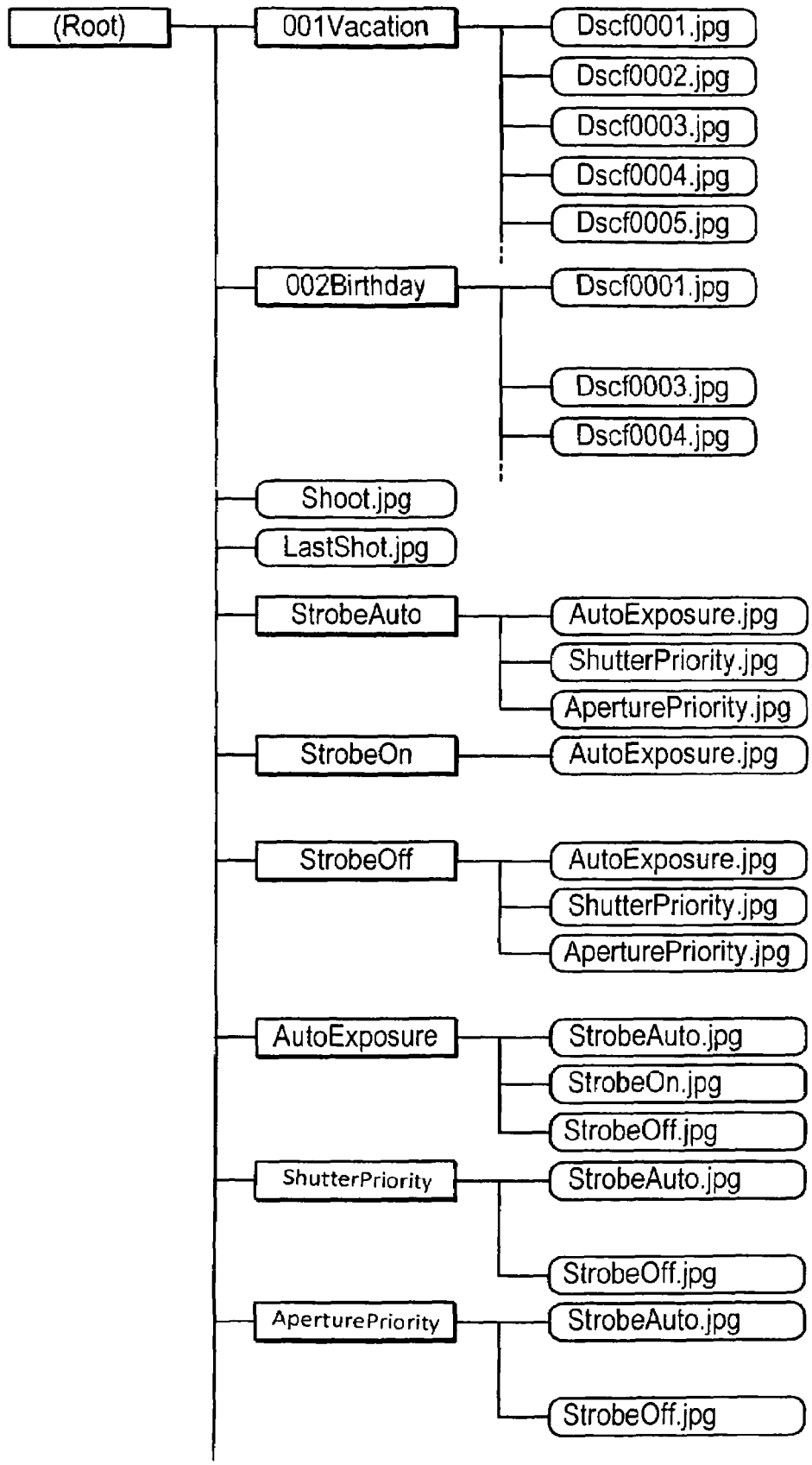
FIG. 10 is a diagram showing virtual directory paths when file names of picked-up images and virtual file names of images to be picked up are classified for each of image pick-up conditions in a tree structure representation.

FIG. 10 shows the paths of virtual directories in which the names of picked-up or shot image files and the names of virtual files to be picked-up are classified for each of pick-up or shooting conditions by using a tree structure.

When the electronic camera receives a command to inquire the directory structure of the image files with respect to a transfer of the image, the information processing device 44 transmits the information of the directories composed of the virtual directories (including virtual folders) classified as shown in FIG. 10 and the virtual image file names to the communication device 80.

Referring to FIG. 10, in the lower hierarchy of the directory "Root", directories "0001Vacation" and "002Birthday" in which the files names of picked up or shot images are stored are provided. Further, as the virtual file names for obtaining the data of shot image or the virtual directory names in which the virtual file names are registered, file names or directory names mentioned below are registered.

"Shoot.jpg" is a basic function file name for picking up or shooting an image. When this virtual file name is selected by the user, the communication device 80 transmits a request for transmitting a file to get this file to the electronic camera 10. When the electronic camera 10 receives the transmission request, the electronic camera 10 sets all the shooting or image pick-up parameters such as the exposure mode or the flash to pick up to an automatic mode to pick up or shoot the image. The image obtained by shooting the image is transmitted to the communication device 80. At this time, the image data obtained by picking up or shooting the image may be transmitted to the communication device 80 and recorded on the recording medium 54 in the electronic camera 10. Further, in the case where the image is picked up again under the same conditions as those under which the image is picked up at the last time, the image file got by photo-shooting the image at the last time may be discarded and a new image got by newly shooting an image may be overwritten thereon, or the file name of the image file obtained as a result of previously shooting the image may be changed and the changed file name may be stored. In this case, the setting modes or the image pick-up or shooting conditions upon shooting the images are stored in the tag 144 of the image file.

"LastShot.jpg" is also a basic function file name. When this file name is selected by the user, the electronic camera 10 transmits the image data picked up at the last time and recorded on the recording medium 54 to the communication device 80. The image data obtained by shooting the image at the last time may be image data got or shot by manually operating the release button 20 of the electronic camera 10 or image data got as a result of instruction to shoot an image through a communication.

A directory of "StorobeAuto" indicates a selection of a mode for picking up or shooting an image by automatically controlling the light emission of a flash. When the virtual file names stored in this virtual directory are selected, an image is picked up or shot by setting the light emission of the flash to an automatic mode and the image data obtained by shooting the image is transmitted to the communication device 80.

In such a way, hierarchies are provided for the function directories, so that a plurality of image pick-up or shooting parameters can be classified and set.

A directory of "StrobeOn" indicates a selection of a mode for picking up or shooting an image by forcedly emitting the light of a flash. When the virtual file names stored in this virtual directory are selected, the light emission of the flash is set to a forced light emission mode to pick up the image and the image data obtained by picking up or shooting the image is transmitted to the communication device 80.

A directory of "StrobeOff" indicates a selection of a mode for picking up or shooting an image without emitting the flash light in order to shoot the image of a night scene or the like. When the virtual file names stored in this directory are selected, an image is picked up or shot without emitting the flash light and the image data obtained by shooting the image is transmitted to the communication device 80.

A directory of "AutoExposure" indicates a selection of a mode for automatically picking up or shooting an image by controlling an exposure such as an aperture, shutter speed, etc. on the basis of a prescribed program. When the virtual file names stored in this virtual directory, an image is picked up or shot under an automatic exposure control and the image data obtained as a result of shooting the image is transmitted to the communication device 80.

A directory of "Shutter Priority" indicates a selection of a mode for picking up or shooting an image under an automatic exposure control on a shutter speed priority basis. When the virtual file names stored in this directory are selected, the image is picked up or shot under an automatic exposure control on a shutter speed priority basis and the image data got by shooting the image is transmitted to the communication device 80.

A directory of "Aperture Priority" indicates a selection of a mode for picking up or shooting an image under an automatic exposure control on a diaphragm aperture priority basis. When the virtual file names stored in the virtual directory are selected, the image is picked up or shot under the automatic exposure control on the diaphragm aperture priority basis and the image data obtained by shooting the image is transmitted to the communication device 80.

A virtual file name of "AutoExposure.jpg" registered in the lower hierarchy of the directory "StorobeAuto" designates a selection of a mode for picking up or shooting an image by performing an automatic exposure control such as a diaphragm aperture, shutter speed, etc. on the basis of a prescribed program. When the virtual file names stored in this virtual directory are selected, the image is shot or picked up under the automatic exposure control and the image data obtained by shooting the image is transmitted to the communication device 80.

In a similar way, a shutter file name of "Shutter Priority.jpg" registered in the hierarchy below the virtual directory of "Strobe Auto" designates a selection of a mode for picking up or shooting an image under an automatic exposure control on a shutter speed basis. A virtual file name of "AperturePriority.jpg" designates a selection of a mode for picking up or shooting an image under an automatic exposure control on a diaphragm aperture priority basis.

Although the virtual file name of "AutoExposure.jpg" is registered in the hierarchy below the virtual directory of "StrobeOn" shown in FIG. 10, the virtual file names of "ShutterPriority.jpg" and "AperturePriority.jpg" are not registered. In such a way, when the forced light emission of a flash is instructed, the image pick-up or shooting mode which is ordinarily unnecessary may not be registered.

FIG. 11 shows the paths of the virtual directory names and the virtual filenames classified into the parameters indicating the image pick-up conditions and the parameters indicating the properties of the image in a tree structure representation.

As shown in this figure, a virtual directory of "Shoot" is registered and virtual directories such as "QVGA", "VGA" and "SVGA" are further registered for each of the parameters indicating the properties concerning the number of pixels of the image. In the virtual directories concerning the number of pixels, virtual files of "Economy.jpg", "Normal.jpg" and "Fine.jpg", etc. indicating compressive conditions are further registered. Still further, the above described virtual directory groups and the virtual file groups may be registered in the virtual directory of "Strobe Auto".

The user selects the file name indicating the desired image pick-up conditions and the properties of the image so that the user can easily obtain the desired picked up or shot image.

The virtual directory of "QVGA" designates a virtual directory in which a series of virtual images of ¼ VGA size are stored. The virtual directory of "VGA" designates a virtual directory in which a series of image files of VGA size are stored. The virtual directory of "SVGA" designates a virtual directory in which a series of image files of SVGA size are stored. The number of pixels is not limited to the above described "QVGA", "VGA" and "SVGA" and the different number of pixels such as "QQVGA", "XGA" or the like may be used. Besides, it is to be understood that the classification of the compressibility of the image is not limited to the above described examples.

In Table 1 shown below, the function directory names and the virtual file names, and examples in which the image pick-up or shooting conditions set by the image pick-up device correspond to the converting functions of the image data obtained by shooting the image are exemplified.

TABLE 1

| Function directory name or function file name | Classification | Function of image pick-up device |
|---|---|---|
| Shoot | Function directory | Set a mode for picking up or shooting an image by making automatic all parameters. |
| Shoot.jpg | Function file | Perform an image pick-up operation by making automatic all parameters and transmit the picked up image to the image information receiver. |
| LastShot | Function directory | Set a mode for transmitting the shot or picked up image by finally using the function file to the image information receiver. |
| LastShot.jpg | Function file | Transmit the image shot by finally using the function file to the image information receiver. |
| StrobeAuto | Function directory | Set a mode for shooting an image by an automatic flash. |
| StrobeAuto.jpg | Function file | Perform an image shooting operation under an automatic flash mode and transmit the shot image to the image information receiver. |
| StrobeOn | Function directory | Set a mode for picking up or shooting an image by forcedly emitting the light of a flash. |
| StrobeOn.jpg | Function file | Shoot an image under a forced flash light emission and transmit the shot image to the image information receiver. |
| StrobeOff | Function directory | Set an image pick-up mode in which a flash light is not emitted. |
| StrobeOff.jpg | Function file | Shoot an image without emitting a flash light and transmit the shot image to the image information receiver. |
| AutoExposure | Function directory | Set a mode for picking up an image under an automatic exposure. |
| AutoExposure.jpg | Function file | Perform an image pick-up operation under an automatic exposure and transmit the picked up image to the image information receiver. |
| SutterPriority | Function directory | Set an image pick-up mode on a shutter speed priority basis. |
| ShutterPriority.jpg | Function file | Perform an image pick-up operation on a shutter speed priority basis and transmit the picked up image to the image information receiver. |
| AperturePriority | Function directory | Set an image pick-up mode on a diaphragm aperture priority basis. |
| AperturePriority.jpg | Function file | Shoot an image on a diaphragm aperture priority basis and transmit the shot image to the image information receiver. |
| QVGA | Function directory | Set a mode for converting the picked up image into the image with the number of pixels of QVGA size. |
| QVGA.jpg | Function file | Convert the picked up image into the number of pixels of QVGA size and transmit the converted image to the image information receiver. |
| VGA | Function directory | Set a mode for converting the picked up image into the image with the number of pixels of VGA size. |
| VGA.jpg | Function file | Convert the picked up image into the image with the number of pixels of VGA size and transmit the converted image to the image information receiver. |
| SVGA | Function directory | Set a mode for converting the picked up image into the image with the number of pixels of SVGA size. |

TABLE 1-continued

| Function directory name or function file name | Classification | Function of image pick-up device |
|---|---|---|
| SVGA.jpg | Function file | Convert the picked up image into the image with the number of pixels of SVGA size and transmit the converted image to the image information receiver. |
| Economy | Function directory | Set a mode for applying a high compression process to the picked up image. |
| Economy.jpg | Function file | Set a mode for applying a high compression process to the picked up image and transmit the processed image to the image information receiver. |
| Normal | Function directory | Set a mode for applying an intermediate compression process to the picked up image. |
| Normal.jpg | Function file | Apply an intermediate compression process to the picked up image and transmit the processed image to the image information receiver. |
| Fine | Function directory | Set a mode for applying a low compression process to the picked up image. |
| Fine.jpg | Function file | Apply a low compression process to the picked up image and transmit the processed image to the image information receiver. |

Now, description examples of the directory information to be transmitted to the image information receiver from the image pick-up device are shown in FIG. 12.

As shown in FIG. 12, in the directory information, are described a symbol "¥" indicating that a current directory (current folder) is a root directory and a folder list in which the directory names or the file names registered in the current directory are registered.

Further, a line in which a section flag of "/D" is described indicates the display of the name of a directory. A line in which a section flag "/F" is described indicates the display of a file name. A section flag of "/S" indicates the size information of a file. Since "LastShot.jpg" designates the file name of the already picked up image, an actual file size "/S=195 KB" is shown. However, "Shoot.jpg" designates a virtual file name of an image which is not picked up or shot. Accordingly. "/S=200 KB" indicates an expected file size calculated by the information processing device on the basis of the parameters showing the image pick-up conditions or the properties of the image. Further, attributes of "exclusively used for reading" indicating that the file name is designated exclusively for reading or attribute information of "not displayed" indicating the file name which is not displayed for the user may be added thereto.

The image information receiver calculates a communication time required for obtaining the file on the basis of the expected file size information and may display the expected communication time. Further, when the size of the image file to be obtained is too large so that it exceeds the receiving capacity of the image information receiver, or when it is expected that a communication needs more time than a prescribed time, an alarm may be sent to the user or the reception of the image may be stopped.

In the case where the image information receiver receives the directory information shown in FIG. 12 and informs the user of the information, for example, the display of the directory information shown in the display 88 in FIG. 5 is performed. In the case where "D: 001 Vacation" is selected while the directory information is displayed on the display 88 in FIG. 5, the display of the display 88 shifts to a Folder Browse display shown in FIG. 13.

Figure 13:
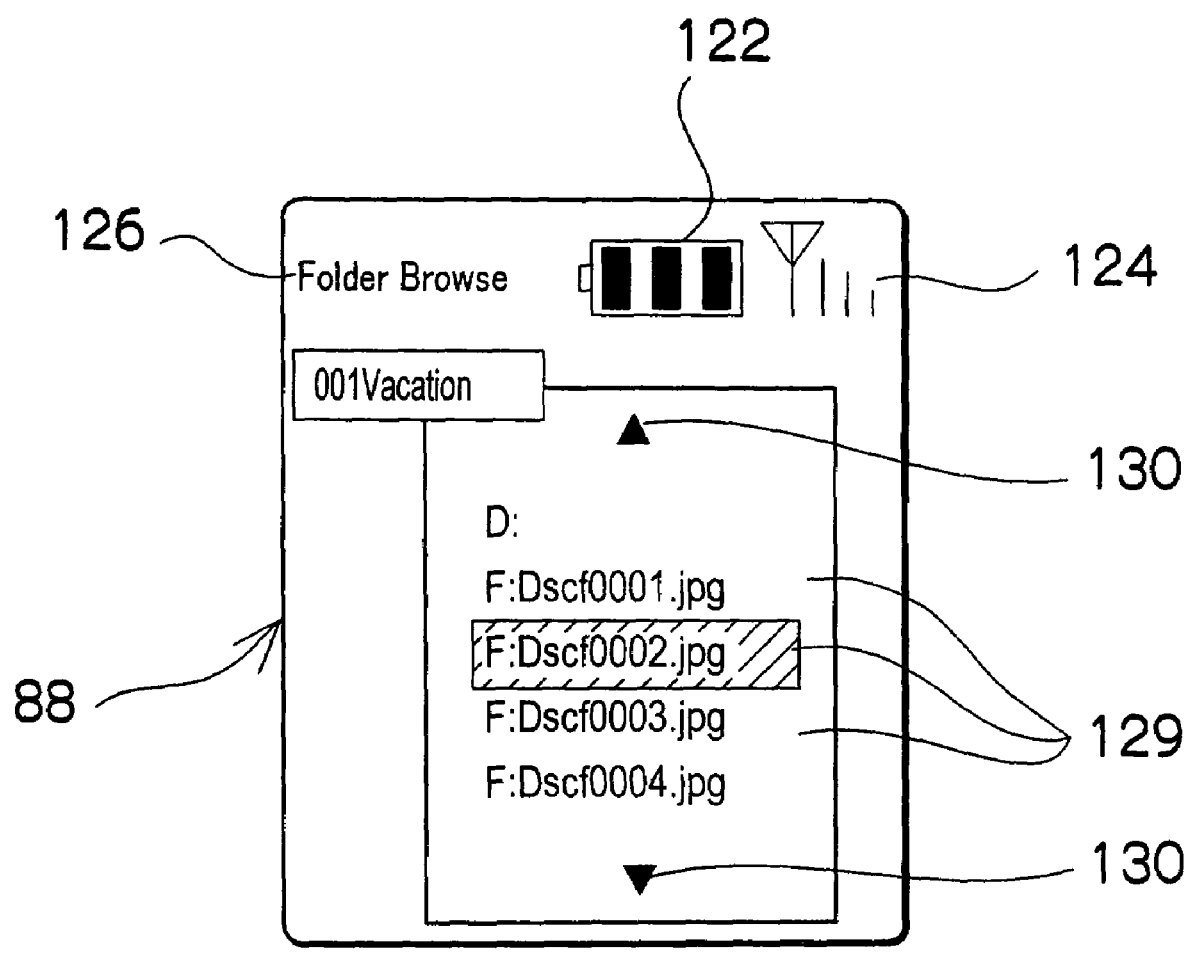
FIG. 13 is a display diagram of a list of file names of picked up images registered in a directory "001Vacation"

The display shown in FIG. 13 represents the list of the file names 129, 129 . . . of the picked up or shot images which are registered in the directory "001Vacation".

In this figure, when a desired image file name is selected, the image of the selected file name is transmitted from the image pick-up device so that the image information receiver can get the desired image. A display part of "D: . . . " shown in FIG. 13 is selected when the display is instructed to shift to a display of a master directory (or folder) located in an upper hierarchy. For displaying the directory information, the file names may be displayed as shown in FIGS. 5 and 13, or the tree structure may be displayed as shown in FIGS. 10 and 11.

Figure 14:
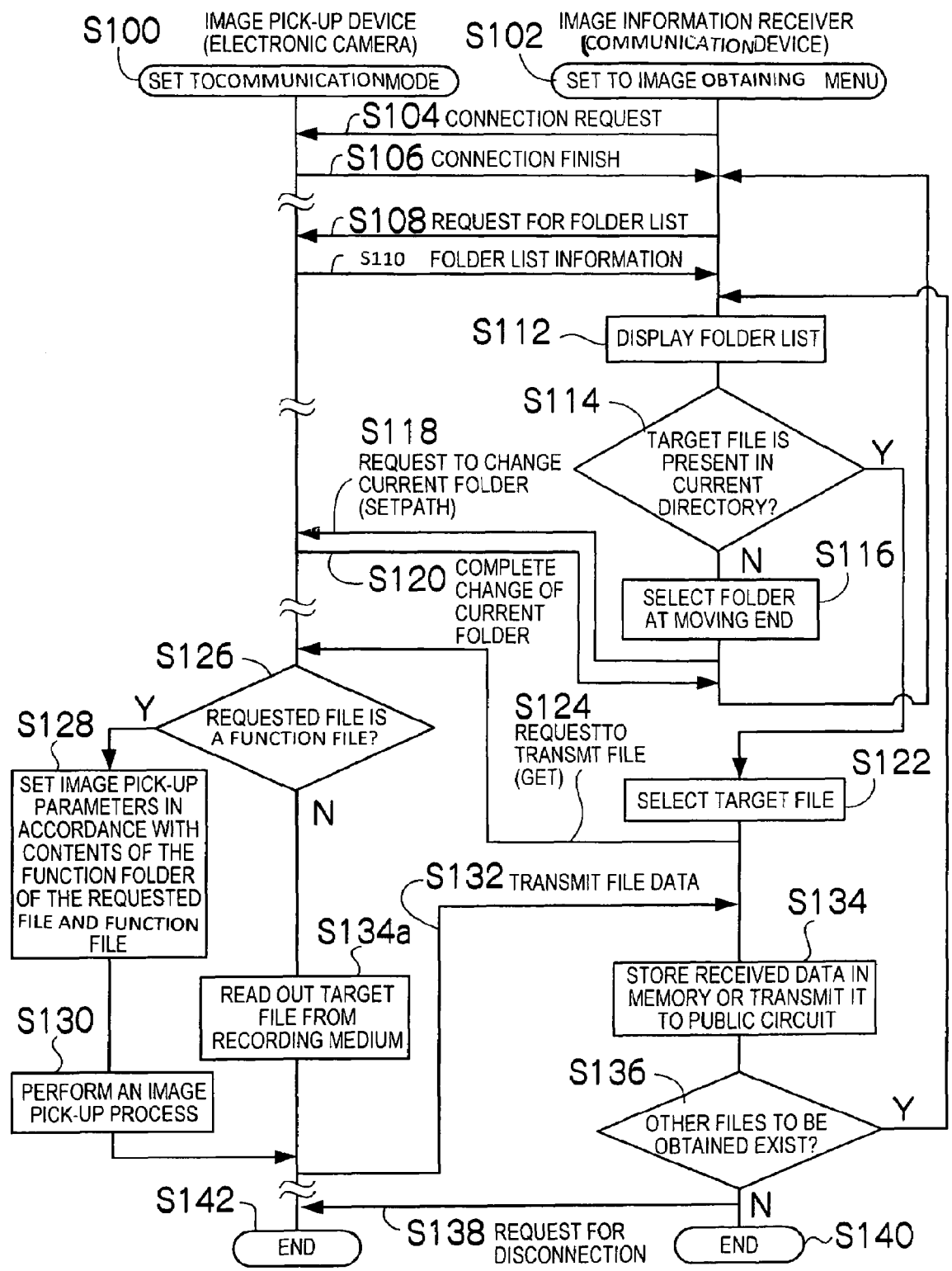
FIG. 14 is a diagram showing a procedure of a communication performed by the image pick-up device and the image information receiver therebetween.

FIG. 14 shows a processing procedure of a communication actually performed between the image pick-up device and the image information receiver.

A communication method shown in FIG. 14 shows a pull model of a type that the user can operate the communication device 80 (for instance, a portable telephone high in its frequency of carrying or usage) to readily get an image recorded in the electronic camera 10.

As shown in FIG. 14, in step S100 of "set an operation mode to a communication mode" (described it only as S100 in abbreviation, hereinafter), the operation mode of the electronic camera 10 is set to a communication mode and the operation mode of the communication mode 80 is set to an image obtaining menu in S102 of "set an operation mode to an image obtaining menu". Then, the communication device 80 transmits a command to the electronic camera 10 in S104 of "a request for connection" in order to start a communication. The electronic camera 10 receives the command of "request for connection" and sends a response for performing a subsequent connection of communication to the communication device 80 in S106 of "completion of connection". In the case where the mode of the electronic camera 10 is a power conservation mode, when the electronic camera receives the "request for connection", the electronic camera 10 automatically cancels or releases the power conservation mode to perform a subsequent communication process.

When the connection of a communication is completed, the communication device 80 transmits a command for obtaining folder list information to the electronic camera 10 in accordance with S108 of "a request for folder list".

When the electronic camera 10 receives the command of "request for folder list", a process for transmitting and receiving information related to the directories (folders) is performed in accordance with S110 of "folder list information". Here, the information processing device 44 transmits the information of the file name or the directory names classified for each of the parameters indicating the pick up conditions or the properties of the image stored in the storing device. Further, when the electronic camera first receives the request for folder list, a current directory may be set to the root directory of the recording medium 54 or may be previously set to a directory high in its usage rate.

The communication device 80 displays (browsing) the folder list information on the basis of the folder list information received in accordance with S112 of "display folder list". In the folder list information to be displayed, the folder list may be displayed by characters or displayed in the tree representation as shown in FIGS. 10 and 11.

Then, the user performs a browsing process from the displayed folder list, and then decides whether or not the target file of the image to be obtained exist in accordance with S114 of "a target file exists in a current directory?".

If the target file to be obtained is not present in the current directory, the pointer 130, 130 shown in FIG. 5 will be selected or a different directory will be selected to select an image under the desired image pick-up conditions (S116 of "select a folder at a moving end"). Then, the processing program of the communication device 80 transmits a current folder change request to the electronic camera 10 in S118 of "request to change (SetPath) a current folder". The electronic camera 10 changes the current folder (current directory) on the basis of the folder change request. When the change of the current folder is completed, the electronic camera 10 informs the communication device 80 of the completion of the change of the current folder in accordance with S120 of "complete the change of a current folder".

When the communication device 80 receives the notification of completion of the change of the current folder, the execution program of the communication device 80 branches before S108 to transmit again a request for a desired folder list to the electronic camera 10. Then, a next folder list is displayed.

If the target file to be obtained exists, the execution program will branch to S122 of "select a target file". Then, the file name of the desired image pick-up conditions is selected and set by using a cross key or a setting button provided on the designating device 90. After that, the electronic camera 10 is requested to transmit the image of the selected and designated file name in accordance with S124 of "request to transmit a file (GET)".

The electronic camera 10 decides whether or not a file demanded in accordance with S126 of "a demanded file is a function file ?" is a function file. If the demanded file is the function file, the procedure advances to S128 of "set the image pick-up parameters on the basis of the function folder of the demanded file and the contents of the function file" to set the image pick-up parameters on the basis of the designated folder name and the file name and set the image pick-up conditions.

In S130 of "perform an image pick-up or shooting operation", an image pick-up or shooting operation is performed in accordance with the image pick-up conditions set on the basis of the image pick-up or shooting parameters set as described above. When the image pick-up process is completed, the image data is converted into the properties of the image instructed as required and the image data is transmitted to the communication device 80 in accordance with S132 of "transmit file data".

Further, in the S126, when the demanded file is not the function file (when the demanded file is a file of a picked up image or the like), the image data recorded in the recording medium 54 is read out in accordance with next S134 of "read out the target file from the recording medium", the image data is converted into the properties of the image according to an instruction as required and the image file is transmitted to the communication device 80 in accordance with the S132 of "transmit file data".

When the image information receiver receives the image file, a process is performed for storing the received data in a memory or transferring the data to other devices through a public circuit in accordance with S134 of "store received data in a memory or transmit to a public circuit".

In S136 of "there exist other files to be obtained?", the user is asked to obtain other files. If there is a request for getting other files, the S136 branches to the S112. If other files are not obtained, the communication device 80 will transmit a disconnection request command for finishing a communication to the electronic camera 10 in accordance with S138 of "request for disconnection". Then, in S140 of "end", the process for obtaining the image is finished.

When the electronic camera 10 receives the disconnection request command, the process for transmitting the image is finished in accordance with S142 of "end".

As described above, the folder list information (directory information) classified in accordance with the image pick-up conditions is transmitted to the communication device 80 and displayed on the display 88 of the communication device 80, so that the user can rapidly select desired kinds of image pick-up or shooting conditions meeting a use and can acquire the picked up image. Further, since the communication device 80 side does not need to previously have setting information related to the parameters indicating a variety of image pick-up conditions of the image or the properties of the image, the burden of the processing programs of the communication device 80 side can be advantageously reduced.

Still further, since the image pick-up device transmits the directory (folder) information classified for each of the parameters indicating the image pick-up conditions or the properties of the image to the communication device 80 to select and designate a desired image, the communication device 80 side is provided with only a program for reading an ordinarily widely utilized file to select and designate a plurality of kinds of images. Further, the processing program of the communication device 80 also merely utilize a tool high in its frequency of usage and familiar to the user, a comfortable operability can be obtained with small burden.

Furthermore, the electronic camera may be set to a power conservation mode and the conservation mode may be cancelled when the electronic camera receives the "request for connection" from the communication device 80 to start communication and information processing processes. Such a configuration allows the image pick-up device to activate a communication mode only at the time of necessity from its stand-by mode, a power consumption to be suppressed and the life of a battery to be lengthened.

In the above described embodiment, although the image pick-up device according to the present invention is described as the electronic camera with the image pick-up device, it is to be understood that the present invention is not limited to the electronic camera and a scanner provided with the image pick-up device may be employed.

Further, in the above described embodiment, although the communication device 80 is described in an example for performing a wireless communication with other communication devices via the public circuit by using the wireless communicating device, it is to be noted that the present invention is not limited to the wireless communication and the wired communicating device may be employed and the communicating device for communicating with wired communication networks may be employed.

Still further, in the above described embodiment, although the image file converted by the information processing device 44 is described as the image file obtained by changing the compressibility of the image data relative to the original image file and the image file whose number of pixels is changed, the present invention is not limited thereto and an image file whose color tone such as gradation, chrome, etc. is changed, an image file whose white balance is changed, an image file whose sharpness is changed, an image file obtained by carrying out a sampling conversion such as YCC 420, YCC422 or the like for converting the image data into a luminance signal and a color difference signal, an image file obtained by performing an RGB conversion for converting the image data into the primary colors of red, green and blue, an image file obtained by performing a white/black conversion, an image file obtained by performing a sepia color conversion and files of different image recording forms, etc. may be newly registered.

Still further, in the case where the display 88 of the communication device 80 is a display capable of performing a color display, the virtual file of a color image may be automatically designated. In the case where the display 88 is only provided with a function of a white/black display, the virtual file of a white/black image may be automatically designated so as to reduce the burden of the user in view of operation.

Still further, the above mentioned communication device (image information receiver or the like) may be a portable terminal equipment or a simple communication device such as a remote controller as a representative example.

Furthermore, in the above described explanation, although the communication device obtains the image from the image pick-up device as an example, it is to be understood that the present invention is not limited thereto and the communication device (information receiver) may select a file name showing desired functions on the basis of the directory information presented from the electronic device to request the electronic device to perform an operation corresponding to the function file name so that the electronic device can perform the function allocated to the function file name and transmit a response to the information receiver. This response may be a response of a command type or a file in which a description showing the result of the operation of the electronic device is present.

FIG. 15 is a block diagram showing an embodiment of an image transmitter and a print system according to the present invention.

An electronic camera 210 comprises a group of lenses 216 for forming the image of an object to be shot on a CCD (solid state image pick-up element) 214, the CCD (image input device) 214 for performing a photo-electronic conversion on the formed image of the object to be shot and outputting the converted image as an analog signal and an A/D converter 218 for converting the analog signal of the image outputted from the CCD 214 into a digital signal.

The information processing device 220 of the electronic camera 210 performs processes for controlling the entire part of the electronic camera 210, controlling the sampling timing of image data or the like in accordance with types for obtaining the image data, generating editing and print information of a displayed image and deciding whether or not an inputted image size is larger than an image size required at the time of printing.

Further, the electronic camera 210 is provided with an image processing device 222 for performing processes such as change of the image size (resizing process), a sharpness correction, a gamma correction, a contrast correction, a white balance correction, etc., a memory buffer 224 for storing the image data on a temporary basis, an input device 226 including a recording button, a communication button, a transmitting button, a function switch, a cursor key, a determining switch, etc. which are not shown provided in the electronic camera 210 and a recording medium I/F 230 for converting the data in order to perform processes for compressing information such as the image data by a method representative of JPE or a motion JPEG and expanding the compressed data and recording or reading the data on/from a detachable recording medium 228.

The recording medium 228 is the detachable recording medium representative of a semiconductor such as a memory card, an MO, etc. a magnetic recording and optical recording medium. In addition thereto, audio information which is not shown as well as the image data may be recorded on the recording medium.

The communicating device 232 of the electronic camera 210 employed when the information such as the image data, the print conditions, etc. is transmitted and received to/from external devices comprises an oscillating part for generating a carrier wave, a transmitting part for transmitting the data on the carrier wave, a receiving part for performing a process to separate the data on the carrier wave and a switching circuit for switching the transmission and reception of the data. The communicating device 232 is provided with an antenna 236 for transmitting and receiving the carrier wave and the data.

Further, the electronic camera 210 is provided with a display 238 for displaying the inputted image data, the print information and the print conditions received from a printer through the communicating device, a D/A converter 240 for converting the data to be displayed on the display 238, an attribute register 242 in which the attributes of a communication partner are stored and a power supply part 244 for supplying a power to respective elements provided in the electric camera 210.

In the information processing device 220, are provided a ROM in which operation programs or respective constants are stored and a RAM as storing means which forms a work area when the programs are executed, which are not shown in FIG. 15.

A control unit of a printer 250 shown in FIG. 15 comprises a CPU (information processing device) 252 for governing the general processes of the printer 250 and editing the displayed image and the print information, a detachable HDD (hard disk drive) 254 for recording a run program or data such as the image data, etc., the display 258 for displaying the print information or a print image, an input device 260 for inputting the print information or processes to the printer 250 by a user, a communicating device 262 having an oscillating part for transmitting and receiving the data to/from the electronic camera 210 and other external devices, a plurality of transmitting and receiving parts 263,263 composed of a transmitting part for transmitting the data on the carrier wave, a receiving part for performing a process to separate the data on the received carrier wave and a switching circuit for switching the transmission and reception of the data, antennas 264, 264 for transmitting and receiving the carrier wave and the data, a general purpose interface 268 for transmitting and receiving the image data to/from a printer unit or a scanner, etc. by a communication, and a ROM. RAM 270 as storing means in which the programs of the CPU 252 or constants such as the print conditions or the like are stored and which serves as the work area of the CPU 252.

The printer unit (print device) of the printer 250 comprises an interface 272 for communicating with the control unit to receive the image data, a RAM 274 as storing means which serves as the work area of the information processor of the printer unit and a print engine 280 for feeding print sheets of paper from a sheet feed part 276 and delivering the print sheets of paper to an output tray 278 after a printing operation.

Now, the image shooting process of the electronic camera 210 configured as described above will be described below.

An image to be shot or picked up is formed on the light receiving face of the CCD (solid state image pick-up element)

214 through the lens group 216. Then image of the object to be shot undergoes a photo-electronic conversion to become an electric charge signal of a quantity corresponding to the quantity of incident light of each sensor in the CCD. The electric charge signal accumulated in the CCD 214 is sequentially outputted in accordance with a shooting timing signal and converted into the digital image data of R, G and B by the A/D converter 218.

The image data obtained in such a way is subjected to processes of amplification and noise reduction in the image processing device 222 and the processed image data is stored in the memory buffer 224 on a temporary basis. The information processing device 220 successively transmits the image data stored in the memory buffer 224 to the D/A converter 240 and displays on the display 258.

When the user presses the recording button provided on the input device 226, the electronic camera 210 enters a mode for shooting or picking up the image of the object to be shot. Then, the information processing device 220 performs a process for sequentially recording the image data on the recording medium 228 relative to the recording medium I/F 230. When the user pushes the transmitting button provided on the input device 226, the information processing device 220 sequentially reads out the designated image data from the recording medium 228, converts the image data into a designated format (including formats after a compression process or a communication error correction function process is performed) and then performs a process for transmitting the converted image data to the external devices such as a personal computer or a printer, etc. through the communicating device 232 and the antenna 236.

Further, when the user edits the image, the cursor key provided on the input device 226 is operated to select the image to be printed, and the function switch is set to a function of "print and edit" to edit the image. At this time, the communicating device 232 starts a connection process of communication with the printer 250 in order to decide whether or not the printer 250 is connected to the communicating device 232.

If the printer 250 is already prepared, the communicating device 232 and the printer 250 will start a communication therebetween, the information related to the print conditions including the resolution of the printer 250 and the size or kinds of sheets of paper with which the printer is charged will be received and stored in the RAM of the information processing device 220 and displayed on the display 238 to inform the user of the information. The user efficiently sets and inputs the print conditions or the print information by referring to the display 238. Then, a new print image is generated on the basis of the set information. When the user does not edit the image to be printed, the user decides the image size using an input image obtained by shooting or picking up an image in such a manner as described below.

Then, the image processing device 220 decides whether or not the image size of the input image obtained by shooting the image or the edited image is larger than an image size required for printing by the printer. When it is decided that the image size is larger than the image size required at the time of printing, the image processing device 222 automatically resizes the input image or the edited image so that the image size thereof is changed to an image size required for printing, generates a new print image and transmits the new print image to the printer.

On the contrary, when it is decided that the image size of the input image or the edited image is not larger than an image size necessary at the time of printing, the input image or the edited image is directly transmitted as the print image to the printer.

Further, when the printer is not prepared yet so that the communicating device 232 cannot communicate with the printer 250, default print conditions stored in the ROM of the information processing device 220 may be displayed on the display 238 so that the user can edit the image.

Referring to FIG. 16, an editing process flow will be described below.

FIG. 16 shows print order information when a shot or picked up input image 282 is subjected to a trimming process to generate an output image 284.

According to FIG. 16, the input image 282 is displayed on the display 238 of the electronic camera 210. The user first designates the print range of the input image 282. In order to designate the print range, the cursor key or the determining switch provided in the input device 226 is operated to designate, for example, the coordinate values (X1, Y1) of a start point from an origin (X0, Y0) of the input image 282 and the size XL and YL of the output image or the coordinate values (X2, Y2) of an end point. Further, in place of the process for designating the coordinate values and the size of the output image 284, the aspect ratio of the image to be printed and the central position and the size or the enlargement ratio of the output image 284 may be set.

Further, as shown in FIG. 16, the size of the image to be printed which is displayed on the basis of the print information received from the printer 250 can be selected and set to 45×35 mm, kinds of sheets (seal paper, ordinary paper, glossy paper, postcard, etc.) can be selected and set, and the print conditions (monochrome, color, sepia, an adjustment of chroma, an adjustment of density, etc), the resolution of an image (dot/mm) and the number of sheets of paper (the number of print sheets, the quantity of print and layout information on one print sheet etc.) can be set.

Even when the image information finer and having a gradation higher than the capacity and resolution of the printer is transmitted to the printer, this only needs a useless communication time and is wasteful, because the image is printed by lowering the resolution and the gradation in the printer. Therefore, the image obtained by automatically resizing is transmitted to the printer.

In the case where the image data of the shot image has the resolution of 2000×1000 and the gradation of 10 bits and the resolution of the printer is 1800×1000 and the printer has the gradation of 10 bits, the electronic camera 210 performs an editing process for converting the image into the print image data having the resolution of 1800×1000 and the gradation of 10 bits and transmits the print image data to the printer.

When the setting of the print conditions is completed as described above, the information processing device 20 performs the editing process for trimming the image and converting the resolution on the basis of the set print conditions to generate the print image.

The print image obtained in such a way and the print information such as the print sheet, the number of print sheets, etc. are transmitted to the printer 250 by pushing the transmitting button provided in the input device 226. As described above, since the image data located in the print range and the print information only required as less as possible are transmitted to the printer 250, a transmitting time can be reduced and a rapid and efficient printing process can be achieved.

In the printer 250, the inputted image data or the set print information are displayed on the display 258 through the communicating device 262 and the printing process is performed on the basis of the designated print information. Then, the number of sheets of the output image 284 for which the printing process is designated can be obtained. Further, in accordance with the instruction of the user, the image data recorded in the HDD 254 can be synthesized, displayed and printed. In this case, a display equal to that shown in FIG. 16 is represented on the display 258 of the printer 250. The print information can be edited in accordance with the print resolution of the printer 250, the print sheets with which the printer is charged and the print characteristics.

In the above described embodiment, although the image transmitter is described as the electronic camera, it is to be understood that the present invention is not limited the electronic camera and a scanner for reading out the image may be employed.

Further, in the above described embodiment, although the image transmitter and the printer perform a wireless communication as an example, it is to be noted that the present invention is not limited to the wireless communication, and the objects of the present invention can be achieved by using a wired parallel or serial communicating device or the like.

As mentioned above, according to the image obtaining method of the present invention, since the image pick-up device has functions for picking up an image upon request for a file and transmitting an image file obtained upon picking up the image and transmits the information of a directory in which the names of function files indicating at least the functions are registered to the image information receiver; the image information receiver selects the name of a desired function file on the basis of the transmitted information of the directory to request the image pick-up device to send an image file corresponding to the function file name; the image pick-up device performs a function allocated to the function file name in accordance with the request for the file; and the image information receiver receives the image file transmitted in accordance with the execution of the function allocated to the function file name, the image pick-up device can be easily remotely controlled from the image information receiver.

Further, according to the present invention, since the image pick-up device comprises a communicating device for transmitting and receiving information to/from an image information receiver for receiving an image file; an information processing device for instructing the information of directories in which the file names of functions indicating at least a function for picking up an image are registered to be transmitted to the image information receiver through the communicating device; and an image pick-up device for picking up an image allocated to the function file name when the image information receiver requests to transmit a file corresponding to the function file name; wherein the information processing device transmits the image file obtained by picking up the image to the image information receiver through the communicating device, the image pick-up device can be readily remotely controlled from the image information receiver.

Still further, according to the present invention, since the image pick-up information transmitting system comprises: a communicating device capable of transmitting and receiving information to/from an image information receiver for receiving an image file; an information processing device for instructing the information of directories in which the file names of functions indicating at least a function for picking up an image are registered to be transmitted to the image information receiver through the communicating device; and an image pick-up device for picking up an image allocated to the function file name when the image information receiver requests to transmit a file corresponding to the function file name; wherein the information processing device comprises an image pick-up device for transmitting an image file obtained by picking up the image to the image information receiver through the communicating device; a first communicating device capable of transmitting and receiving information to/from the image pick-up device; a display for displaying the information of the directories presented from the image pick-up device; and a selecting device for selecting and designating a desired function file name showing a desired function on the basis of the displayed information of the directories, the image pick-up device can be easily remotely controlled from the image information receiver, the image can be obtained and the obtained image can be transmitted to other communication devices.

As described above, according to the present invention, since the image transmitter for transmitting a print image to a printer comprises an image input device for picking up or inputting an image; a deciding device for deciding whether or not the image size of the input image thus inputted or an edited image obtained by editing the input image is larger than an image size required for printing by the printer; an image processing device for resizing the size of the input image or the edited image so as to be an image size required for printing to generate the print image when it is decided that the image size is larger by the deciding device; and a communicating device for transmitting the input image or the edited image to the printer as the print image when it is decided that the image size of the input image or the edited image is not larger by the deciding device, and transmitting the print image generated by the image processing device to the printer when it is decided that the size of the input image or the edited image is larger, image data to be transferred is minimized as required, a communication time is reduced and a desired image can be printed in a short time.

Further, according to the present invention, since the print system comprises: an image transmitter including an image input device for picking up or inputting an image, a first display for displaying the inputted image, a first input device for inputting and setting print information upon printing the displayed image, a deciding device for deciding whether or not the size of the input image thus inputted or an edited image obtained by editing the input image on the basis of the print information is larger than an image size required for printing by a printer, an image processing device for resizing the size of the input image or the edited image so as to be an image size required for printing to generate a print image when the deciding device decides that the image size is larger, and a first communicating device for transmitting the input image or the edited image and the print information when it is decided that the size of the input image or the edited image is not larger by the deciding device, and transmitting the print image generated by the image processing device and the print information to the printer when it is decided that the size of the input image or the edited image is larger; and a printer including a second communicating device for receiving the image and the print information transmitted from the first communicating device, a second display for displaying at least the print information, and a print device for printing the image on the basis of the received image or the received image and the print information, image data to be transferred may be minimized as required, a communication time can be shortened and a desired image can be printed in a short time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image obtaining method, comprising:
selecting, using an image information receiver, a name of a desired file from a directory transmitted from an image pick-up device; and
receiving an image file, said image file representing an image captured by the image pick-up device, corresponding to the desired file,
wherein the image pick-up device picks up an image upon request from a communication device, transmits an image file obtained upon picking up the image, and transmits the directory, in which names of function files indicating at least a function of the function files is registered, to the image information receiver, said function files each being associated with a function to be performed by said image pick-up device,
wherein the image information receiver selects the name of a desired function file from the directory to request the image pick-up device to send an image file corresponding to the function file name,
wherein the image pick-up device performs a function allocated to the function file in accordance with the request for the file, and
wherein the image information receiver receives the image file transmitted in accordance with execution of the function allocated to the function file.

2. The image obtaining method according claim 1, wherein the image pickup device records an image obtained by executing the function allocated to the function file on a recording medium.

3. The image obtaining method according to claim 1, wherein the information of the directory designates names of paths, to which the function file belong, or folders.

4. The image obtaining method according to claim 1, wherein the information of the directory includes the file names of picked-up images.

5. The image obtaining method according to claim 1, wherein the image information receiver displays at least one of the file name, a directory name, a path name of a file and a size of a file on the basis of information of the directory received from the image pick-up device.

6. The image obtaining method according to claim 5, wherein the image information receiver calculates an expected communication time required for acquiring the file on the basis of the file size and does not acquire the image when the expected communication time thus calculated is larger than a predetermined communication time threshold value.

7. The image obtaining method according to claim 1, wherein the image information receiver displays the directory in a tree representation on the basis of information of the directory.

8. The image obtaining method according to claim 1, wherein the image information receiver transmits and receives information to and from other communication devices other than the image pick-up device through public lines or communication networks and transmits the selected image file to the other communication devices.

9. The image obtaining method according to claim 1, comprising one of:
connecting devices for transmitting and receiving information together by cables when the information is transmitted and received, and converting the information into an electric signal or an optical signal to transmit and receive the information by a wire communication; and
converting the information into an electric wave signal or an optical signal to transmit and receive the information by a wireless communication.

10. The image obtaining method according to claim 1, wherein the image information receiver can transmit and receive information to and from other communication devices other than the image pick-up device through public lines or communication networks and also can transmit and receive an audio signal.

11. The image obtaining method according to claim 1, wherein the image pick-up device sets a power conservation mode for decreasing the power consumption of the device and cancels the power conservation mode when the image pick-up device receives the information from the image information receiver upon setting the power conservation mode.

12. The image obtaining method according to claim 1, wherein the function files are classified under at least one of parameters indicating image pick-up conditions and parameters indicating the properties of an image.

13. The image obtaining method according to claim 12, wherein the image pick-up device transmits the parameters classified for each function so as to attach the parameters to the image file transmitted by executing the function allocated to the function file.

14. The image obtaining method according to claim 12, wherein the parameters indicating the image pick-up conditions include at least one of an exposure condition, a flash light emitting condition, a white balance condition, a focus condition and a zoom condition, and the parameters indicating the properties of the image include at least one of the number of pixels, a compressibility, a sampling method and color information.

15. The image obtaining method according to claim 14, wherein the image pick-up device transmits the parameters classified for each function so as to attach the parameters to the image file transmitted by executing the function allocated to the function file.

16. The image obtaining method according to claim 12, wherein the information of the directories is registered with names indicating the image pick-up conditions or the properties of the image.

17. The image obtaining method according to claim 12, wherein the directories constitute a layered structure and are classified for each of parameters showing a plurality of image pick-up conditions and the properties of the image.

18. The image obtaining method according to claim 12, wherein the information of the directory includes the file names of picked-up images.

19. The image obtaining method according to claim 12, wherein expected file sizes after the image is picked-up on the basis of the parameters showing the image pick-up conditions and the properties of the image are registered as well as the file names in the information of the directories.

20. The image obtaining method according to claim 19, wherein the image information receiver calculates an expected communication time required for acquiring the file on the basis of the file size and does not acquire the image when the expected communication time thus calculated is larger than a predetermined communication time threshold value.

21. The image obtaining method according to claim 12, wherein the image information receiver displays at least one of the file name, the directory name, the path name of a file and the size of a file on the basis of information of the directory.

22. The image obtaining method according to claim 21, wherein the image information receiver calculates an expected communication time required for acquiring the file on the basis of the file size and does not acquire the image when the expected communication time thus calculated is larger than a predetermined communication time threshold value.

23. The image obtaining method according to claim 12, wherein the image information receiver displays the information of the directory in a tree representation on the basis of the information of the directory.

24. The image obtaining method according to claim 12, wherein the image information receiver transmits and receives information to and from other communication devices other than the image pick-up device through public lines or communication networks and transmits the selected image file to the other communication devices.

25. The image obtaining method according to claim 12, comprising one of:
   connecting the devices for transmitting and receiving the information together by cables when the information is transmitted and received, and converting the information into an electric signal or an optical signal to transmit and receive the information by a wire communication; and
   converting the information into an electric wave signal or an optical signal to transmit and receive the information by a wireless communication.

26. The image obtaining method according to claim 12, wherein the image information receiver can transmit and receive the information to and from the other communication devices other than the image pick-up device through the public lines or the communication networks and also can transmit and receive an audio signal thereto/therefrom.

27. The image obtaining method according to claim 12, wherein the image pick-up device sets a power conservation mode for decreasing the power consumption of the device and cancels the power conservation mode when the image pick-up device receives the information from the image information receiver upon setting the power conservation mode.

28. An image pick-up device, comprising:
   a communicating device which transmits and receives information to and from an image information receiver for receiving an image file;
   an image pick-up device, which is capable of forming an image of an object to be shot; and
   an information processing device which instructs said image-pick up device to transmit a directory, which includes function files, to the image information receiver through the communicating device, said function files each being associated with a function to be performed by said image pick-up device,
   wherein said image pick-up device picks up an image allocated to the function file when the image information receiver requests to transmit a file corresponding to the function file, and
   wherein the information processing device transmits the image file obtained by picking up the image to the image information receiver through the communicating device.

29. The image pick-up device according to claim 28, wherein the image information processing device records an image obtained by executing the function allocated to the function file on a recording medium.

30. The image pick-up device according to claim 28, wherein names of paths, to which the function file belongs, or folders are registered in the directory.

31. The image pick-up device according to claim 28, wherein names indicating the image pick-up conditions or the properties of the image are registered in the directory.

32. The image pick-up device according to claim 28, wherein layered structures classified for each of parameters showing a plurality of image pickup conditions and the properties of the image are registered in the directory.

33. The image pick-up device according to claim 28, wherein the directory includes the file names of picked-up images.

34. The image pick-up device according to claim 28, wherein the information processing device registers expected file sizes after the image is picked-up on the basis of the parameters showing the image pick-up conditions and the properties of the image are registered as well as the file names.

35. The image pick-up device according to claim 28, wherein the communicating device comprises at least one of:
   a communicating device serving to connect devices for transmitting and receiving information together by cables so as to convert the information into an electric signal or an optical signal and transmit and receive the information by a wire communication; and
   a communicating device serving to convert the information into an electric wave signal or an optical signal and transmit and receive the information by a wireless communication.

36. The image pick-up device according to claim 28, wherein the information processing device is provided with a power conservation setting device which sets a power conservation mode for decreasing the power consumption of the image pick-up device and canceling the power conservation mode when the image pick-up device receives the information from the image information receiver upon setting the power conservation mode.

37. The image pick-up device according to claim 28, wherein the information processing device instructs information of the directory in which the function files are classified under at least one of parameters indicating image pick-up conditions and parameters indicating the properties of an image to be transmitted to the image information receiver through the communicating device.

38. The image pick-up device according to claim 37, wherein the parameters indicating the image pick-up conditions include at least one of an exposure condition, a flash light emitting condition, a white balance condition, a focus condition and a zoom condition, and the parameters indicating the properties of the image include at least one of the number of pixels, a compressibility, a sampling method and color information.

39. The image pick-up device according to claim 37, further comprising:
   a converted image generating device which generates a converted image in which the parameters indicating the properties of the image are changed relative to an image got by an image picking up operation as required,
   wherein the image processing device transmits the converted image thus generated to the image information receiver.

40. The image pick-up device according to claim 39, wherein the parameters indicating the image pick-up conditions include at least one of an exposure condition, a flash light emitting condition, a white balance condition, a focus condition and a zoom condition, and the parameters indicating the properties of the image include at least one of the number of pixels, a compressibility, a sampling method and color information.

41. The image pick-up device according to claim 39, wherein the information processing device transmits the parameters classified for each of functions attached with the image file transmitted by executing the function allocated to the function file.

42. The image pick-up device according to claim 37, wherein the information processing device transmits the parameters classified for each of functions attached with the image file transmitted by executing the function allocated to the function file.

43. The image pick-up device according to claim 37, wherein the image information processing device records an image obtained by executing the function allocated to the function file on a recording medium.

44. The image pick-up device according to claim 37, wherein the names of paths, to which the function files belong, or folders are registered in the directory.

45. The image pick-up device according to claim 37, wherein names indicating the image pick-up conditions or the properties of the image are registered in the directory.

46. The image pick-up device according to claim 37, wherein layered structures classified for each of parameters showing a plurality of image pickup conditions and the properties of the image are registered in the directory.

47. The image pick-up device according to claim 37, wherein the directory includes the file names of picked-up images.

48. The image pick-up device according to claim 37, wherein the information processing device registers expected file sizes after the image is picked-up on the basis of the parameters showing the image pick-up conditions and the properties of the image are registered as well as the file names.

49. The image pick-up device according to claim 37, wherein the communicating device comprises at least one of:
  a communicating device serving to connect devices for transmitting and receiving information together by cables so as to convert the information into an electric signal or an optical signal and transmit and receive the information by a wire communication; and
  a communicating device serving to convert the information into an electric wave signal or an optical signal and transmit and receive the information by a wireless communication.

50. The image pick-up device according to claim 37, wherein the information processing device is provided with a power conservation setting device which sets a power conservation mode for decreasing the power consumption of the image pick-up device and canceling the power conservation mode when the image pick-up device receives the information from the image information receiver upon setting the power conservation mode.

51. An image pick-up device, comprising:
  an image pick-up device, which is capable of forming an image of an object to be shot;
  a storage device which stores a directory, the directory including image files and function files, said image files representing an image captured by the image pick-up device, wherein names of the functions files indicate at least a function for picking-up an image;
  a communicating device which transmits and receives information to and from the image pick-up device for receiving an image file;
  wherein the image pick-up device transmits the directory to said communicating device,
  wherein said communicating device selects a file from the directory and transmits a file request to said image pick-up device,
  wherein, upon receipt of the file request, said image pick-up device determines whether the requested file is an image file or a function file,
  wherein when the requested file is an image file, said image pick-up device transmit the image file to said communicating device and when the requested file is a function file, said image pick-up device performs an image pick-up function associated with the function file and then transmits a resulting image file to the communicating device.

* * * * *